(12) United States Patent
Onoguchi

(10) Patent No.: US 11,983,447 B2
(45) Date of Patent: May 14, 2024

(54) CONTROL METHOD OF INFORMATION PROCESSING APPARATUS, INFORMATION PROCESSING APPARATUS, AND STORAGE MEDIUM

(71) Applicant: CANON KABUSHIKI KAISHA, Tokyo (JP)

(72) Inventor: Ryota Onoguchi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/086,985

(22) Filed: Dec. 22, 2022

(65) Prior Publication Data

US 2023/0205465 A1    Jun. 29, 2023

(30) Foreign Application Priority Data

Dec. 28, 2021 (JP) ................. 2021-214339

(51) Int. Cl.
*G06F 3/12*     (2006.01)
*H04N 1/00*    (2006.01)
*H02N 1/00*    (2006.01)

(52) U.S. Cl.
CPC ......... *G06F 3/1208* (2013.01); *G06F 3/1205* (2013.01); *G06F 3/1259* (2013.01); *H04N 1/0044* (2013.01)

(58) Field of Classification Search
CPC ........ G06F 3/12; G06F 3/1204; G06F 3/1208; G06F 3/1247; G06F 3/1256; G06F 3/1285; G06F 3/1296; G06F 3/1297; G06F 3/1206; G06F 3/1243; G06F 3/04886; G06F 3/125; G06F 3/1253; G06F 3/1284; H04N 2201/0067; H04N 1/00; H04N 1/00209; H04N 1/00212; H04N 2201/0015; H04N 2201/0086; H04N 1/00132; H04N 1/00137; H04N 1/00145; H04N 1/00188; H04N 1/00307; H04N 1/00347; H04N 1/00408; H04N 2201/0082; H04N 2201/0087; B41F 15/0881; B41F 15/42; B41F 33/0009; H05K 3/1233; H05K 3/3485; G03G 15/5087; G03G 15/655; G03G 2215/00109; H04M 1/72409
USPC ....................................................... 358/1.15
See application file for complete search history.

(56) References Cited

U.S. PATENT DOCUMENTS

| | | | | |
|---|---|---|---|---|
| 7,046,385 B2 * | 5/2006 | Mori | ................. | G06K 15/00 |
| | | | | 358/1.18 |
| 7,394,562 B2 * | 7/2008 | Nakagiri | ................. | G06K 15/02 |
| | | | | 358/1.9 |
| 7,911,638 B2 * | 3/2011 | Kashiwagi | ................. | H04N 1/0044 |
| | | | | 358/401 |
| 7,929,174 B2 | 4/2011 | Nakagiri et al. | | |
| 10,841,435 B2 * | 11/2020 | Ogawa | ................. | H04N 1/00442 |

(Continued)

FOREIGN PATENT DOCUMENTS

JP    2003-162520 A    6/2003

*Primary Examiner* — Negussie Worku
(74) *Attorney, Agent, or Firm* — VENABLE LLP

(57) ABSTRACT

A control method of an information processing apparatus identifies remaining page data, among a plurality of page data to be printed, being not printed due to suspension of print processing, and displays a preview image of the identified remaining page data as a print target without a user selecting the remaining page data.

23 Claims, 23 Drawing Sheets

(56) References Cited

U.S. PATENT DOCUMENTS

| | | | |
|---|---|---|---|
| 2002/0039141 A1* | 4/2002 | Washisu | H04N 1/2154 |
| | | | 348/231.6 |
| 2003/0056178 A1* | 3/2003 | Sato | G06F 40/106 |
| | | | 715/209 |
| 2003/0103236 A1* | 6/2003 | Kato | G06F 3/1234 |
| | | | 358/1.15 |
| 2005/0128500 A1* | 6/2005 | Nakagiri | B42C 19/00 |
| | | | 358/1.9 |
| 2005/0259295 A1* | 11/2005 | Nagao | H04N 1/60 |
| | | | 715/204 |
| 2006/0132843 A1* | 6/2006 | Jim | H04N 1/00347 |
| | | | 358/1.15 |
| 2012/0026515 A1* | 2/2012 | Muramoto | H04N 1/387 |
| | | | 358/1.16 |
| 2018/0146115 A1* | 5/2018 | Thompson | G06F 3/1204 |
| 2018/0341438 A1* | 11/2018 | Sun | G06F 3/1285 |
| 2019/0222704 A1* | 7/2019 | Kanai | H04N 1/00482 |

* cited by examiner

CONTROL METHOD OF INFORMATION PROCESSING APPARATUS, INFORMATION PROCESSING APPARATUS, AND STORAGE MEDIUM

This application claims the benefit of Japanese Patent Application No. 2021-214339, filed Dec. 28, 2021, which is hereby incorporated by reference herein in its entirety.

BACKGROUND

Field of the Invention

The present disclosure relates to a control method of an information processing apparatus, an information processing apparatus, and a storage medium.

Description of the Related Art

Japanese Patent Laid-Open No. 2003-162520 discloses performing printing on designated pages. In a case where an error occurs during printing, reprinting of the pages that were not printed may be desired.

However, with the technology of Japanese Patent Laid-Open No. 2003-162520, the user has to designate the range of the reprinting, which involves complicated operations.

The present disclosure has been made in view of the above problem, and an object thereof is to provide a technology that improves user-friendliness of printing.

SUMMARY

To achieve the above object, a control method of an information processing apparatus, the control method comprising the step of: identifying page data being not printed due to suspension of print processing, the page data marking one page of a plurality of pages in document data to be subjected to printing; and displaying a preview image of the page data being not printed in an automatically selected state.

Further features of the present invention will become apparent from the following description of exemplary embodiments with reference to the attached drawings.

BRIEF DESCRIPTION OF THE DRAWINGS

FIG. 16 is a diagram illustrating an example of a setting screen for page-designated printing;

DESCRIPTION OF THE EMBODIMENTS

Embodiments of the present disclosure will be described below with reference to the drawings.

First Embodiment (Configurations of System and Apparatuses)

Figure 1:
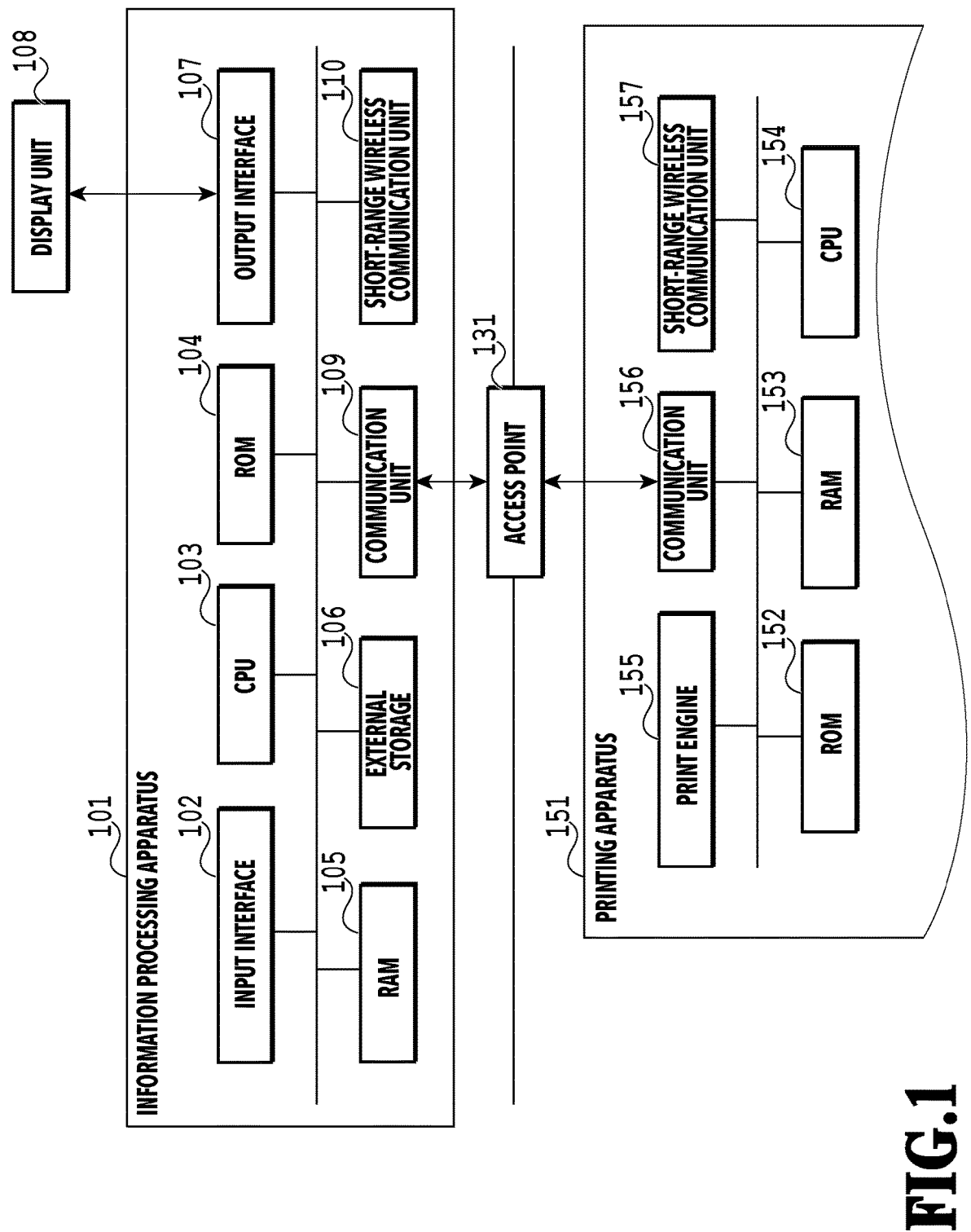
FIG. 1 is a diagram illustrating an example configuration of a system and example hardware configurations of apparatuses.

FIG. 1 is a diagram illustrating an example configuration of a system and example hardware configurations of apparatuses. The system includes an information processing apparatus 101 and a printing apparatus 151. Print processing is executed by transmitting print data prepared by the information processing apparatus 101 to the printing apparatus 151 through a network. The information processing apparatus 101 and the printing apparatus 151 communicate with each other via an access point 131 through a wireless LAN complying with the IEEE 802.11 standard series, for example. Embodiments based on a network configuration using the access point 131 will be described below, but another configuration that enables the information processing apparatus 101 and the printing apparatus 151 to communicate with each other may be used instead. For example, the information processing apparatus 101 and the printing apparatus 151 may be linked through a wired channel not illustrated. Alternatively, an apparatus having the functions of both the information processing apparatus 101 and the printing apparatus 151 may be used. In this case, the communication of information between the information processing apparatus 101 and the printing apparatus 151 is performed through a bus and the like in the apparatus. The plurality of blocks illustrated in FIG. 1 may be integrated into a single block. Moreover, a single block may be divided into a plurality of blocks. Blocks other those illustrated in FIG. 1 may be added. Moreover, one or more of the blocks illustrated in FIG. 1 may be omitted.

The information processing apparatus 101 is an arithmetic apparatus capable of converting data to be printed into print data, such as a personal computer (PC), smartphone, mobile terminal, laptop PC, tablet terminal, or personal digital assistant (PDA), for example. The printing apparatus 151 is any printer capable of obtaining print data from an external apparatus, such as the information processing apparatus 101, and executing print processing with the print data. The printing apparatus 151 executes printing by an inkjet method in the present embodiment, but may execute printing by any other method such as an electrophotographic method, for example. The printing apparatus 151 may alternatively be a multi-function peripheral having a plurality of functions such as a photocopying function, a facsimile function, and a printing function.

The information processing apparatus 101 includes, for example, an input interface 102, CPU 103, ROM 104, RAM 105, external storage 106, output interface 107, communication unit 109, and short-range wireless communication unit 110. "CPU", "ROM", and "RAM" are acronyms for "Central Processing Unit", "Read Only Memory", and "Random Access Memory", respectively. FIG. 1 exemplarily illustrates an example of a case where the information processing apparatus 101 displays information on an external display unit 108 (e.g., a display apparatus such as a monitor), but the information processing apparatus 101 may incorporate the display unit 108.

The input interface 102 is an interface for receiving data inputs and operation instructions from the user. The input interface 102 includes, for example, a physical keyboard, buttons, a touch panel, or the like. The output interface 107 to be described later and the input interface 102 may be integrated so that a single piece of hardware can be used to output screens and receive user operations.

The CPU 103 is a system control unit and comprehensively controls the information processing apparatus 101. The ROM 104 stores pieces of fixed data such as control programs to be executed by the CPU 103, data tables, and a built-in operating system (hereinafter referred to as "OS") program. In the present embodiment, each control program stored in the ROM 104 performs software execution control such as scheduling, task switching, and interrupt handling under the control of the built-in OS stored in the ROM 104. The RAM 105 includes a static random access memory (SRAM) or the like that requires a backup power supply. The data in the RAM 105 are retained with a primary cell for data backup not illustrated. Thus, the RAM 105 is capable of storing important data, such as program control variables, without letting the data evaporate. The RAM 105 also has memory areas to store setting information, management data, and the like of the information processing apparatus 101. The RAM 105 can also be used as a main memory and a work area for the CPU 103.

The external storage 106 saves therein an application that provides a function of executing printing, a print information generation program that generates print information which the printing apparatus 151 can interpret, and the like. The external storage 106 can also save therein various programs such as a control program for sending and receiving information to and from another apparatus linked via the communication unit 109 (e.g., printing apparatus 151) and various pieces of information to be used by these programs.

The output interface 107 is an interface for performing information presentation control (information display control) for the display unit 108 to display data and present information on statuses of the information processing apparatus 101. The output interface 107 outputs, for example, control information and display target information for causing the display unit 108 to display information. The display unit 108 includes a light emitting diode (LED) display, a liquid crystal display (LCD), or the like, and displays data and notifies the user of statuses of the information processing apparatus 101. Note that a software keyboard including keys such as number input keys, mode setting keys, an enter key, a cancel key, and a power key may be displayed on the display unit 108, and inputs may be received from the user via that software keyboard.

The communication unit 109 includes a base band circuit, a radio frequency (RF) circuit, and the like for linking to an external apparatus, such as the printing apparatus 151, and executing data communication. For example, the communication unit 109 is capable of communicating with a printing apparatus 151 via an access point 131 other than that present for the above described information processing apparatus 101 and printing apparatus 151. The access point 131 can be a device such as a wireless LAN router that operates by a wireless communication method complying with the IEEE 802.11 standard series, for example. The communication unit 109 may directly establish a connection to the printing apparatus 151 by following a protocol such as Wi-Fi (Wireless Fidelity) Direct (registered trademark). Moreover, in a case where the printing apparatus 151 includes an access point not illustrated, the communication unit 109 may link to that access point to directly establish a connection to the printing apparatus 151. The communication unit 109 is configured to perform communication by Wi-Fi (registered trademark), but may perform communication by another wireless communication method, such as Bluetooth (registered trademark).

The short-range wireless communication unit 110 establishes a wireless connection to a short-range wireless communication unit 157 of the printing apparatus 151 (external apparatus) in response at least to entry of the printing apparatus 151 into a predetermined short distance range, and executes data communication with it. The short-range wireless communication unit 110 performs the communication by a communication method different from that of the communication unit 109, such as Bluetooth Low Energy (BLE).

The printing apparatus 151 includes, for example, a ROM 152, a RAM 153, a CPU 154, a print engine 155, a communication unit 156, and the short-range wireless communication unit 157. The communication unit 156 includes a base band circuit, a radio frequency (RF) circuit, and the like for linking to an external apparatus, such as the information processing apparatus 101. The communication unit 156 corresponds to the communication unit 109 of the information processing apparatus 101 and performs communication by a wireless communication method such as Wi-Fi or Bluetooth, for example. For example, the communication unit 156 may directly link to the communication unit 109 of the information processing apparatus 101 by functioning as an access point or by following a predetermined protocol, as described above, or link to the communication unit 109 through the external access point 131 or the like. In the case where the communication unit 156 functions as an access point, the communication unit 156 may have hardware that enables itself to function as an access point or utilize software that enables itself to function as an access point. Although the information processing apparatus 101 and the printing apparatus 151 are linked to a single access point 131 in the example of FIG. 1, they may each be linked to a different access point linked to a network and linked to the other through the network.

The short-range wireless communication unit 157 establishes a wireless connection to the short-range wireless communication unit 110 of the information processing apparatus 101 (external apparatus) in response at least to entry of the information processing apparatus 101 into a predetermined short distance range, and executes data communication with it. The short-range wireless communication unit 157 corresponds to the short-range wireless communication unit 157 of the information processing apparatus 101 and performs communication by a wireless communication method such as BLE, for example. Note that, for example, print information to be transmitted from the information processing apparatus 101 or the like contains a large amount of data and requires high-speed, large-capacity communication and will therefore be received via the communication unit 156, which is capable of faster communication than the short-range wireless communication unit 157.

The RAM 153 is a similar memory to the RAM 105. The RAM 153 has memory areas to store setting information, management data, and the like of the printing apparatus 151. The RAM 153 is also used as a main memory and a work area for the CPU 154 and functions as a reception buffer to temporarily save print information received from the information processing apparatus 101 or the like. Moreover, the RAM 153 saves various pieces of information. The ROM 152 stores pieces of fixed data such as control programs to be executed by the CPU 154, data tables, and a built-in OS program. The CPU 154 executes each control program stored in the ROM 152 to perform software execution control such as scheduling, task switching, and interrupt handling under the control of the built-in OS stored in the ROM 152. The CPU 154 is a system control unit and comprehensively controls the printing apparatus 151. A memory such as an external hard disk drive (HDD) or a Secure Digital (SD) card may be attached to the printing apparatus 151 as an optional device, and information to be saved in the printing apparatus 151 may be saved in such a memory.

The print engine 155 forms an image on a printing medium, such as paper, by using a printing material, such as an ink, based on information saved in the RAM 153 and print information received from the information processing apparatus 101 or the like, and outputs a print result. In the following description, a paper printing medium will be referred to as "paper sheet".

Figure 2:
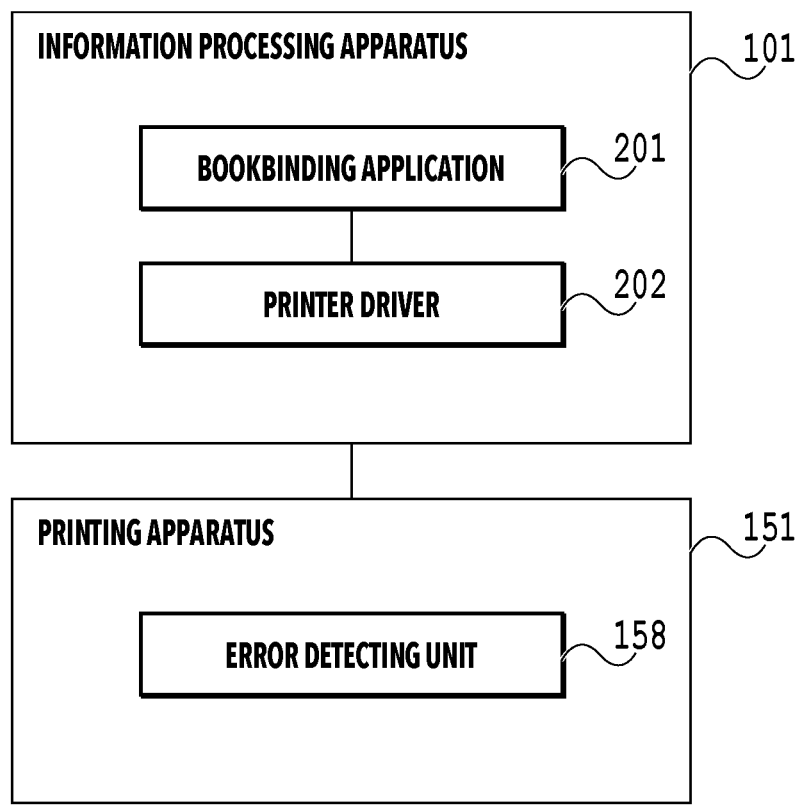
FIG. 2 is a diagram illustrating example software configurations of the information processing apparatus and the printing apparatus.

FIG. 2 is a diagram illustrating example functional configurations of the information processing apparatus 101 and the printing apparatus 151. The information processing apparatus 101 has, for example, a bookbinding application 201 that executes processes to be described later and a printer driver 202 that generates print data which the printing apparatus 151 can interpret, as its functional components. In a case where the user inputs a print instruction on a screen of the bookbinding application 201 to be described later, the printer driver 202 receives application data output from the bookbinding application 201 and generates print data based on it. Note that inputting a print instruction on the screen of the bookbinding application 201 is equivalent to, for example, pressing a "Print" button 607 in FIG. 6. The printer driver 202 then transmits the generated print data to the printing apparatus 151. In response to this, the printing apparatus 151 executes print processing. The printing apparatus 151 has an error detecting unit 158 as its functional component. The error detecting unit 158 is capable of detecting errors such as a paper jam and multi-feed during printing by publicly known methods.

(General Description of Operation of Bookbinding Application 201)

Figure 3:
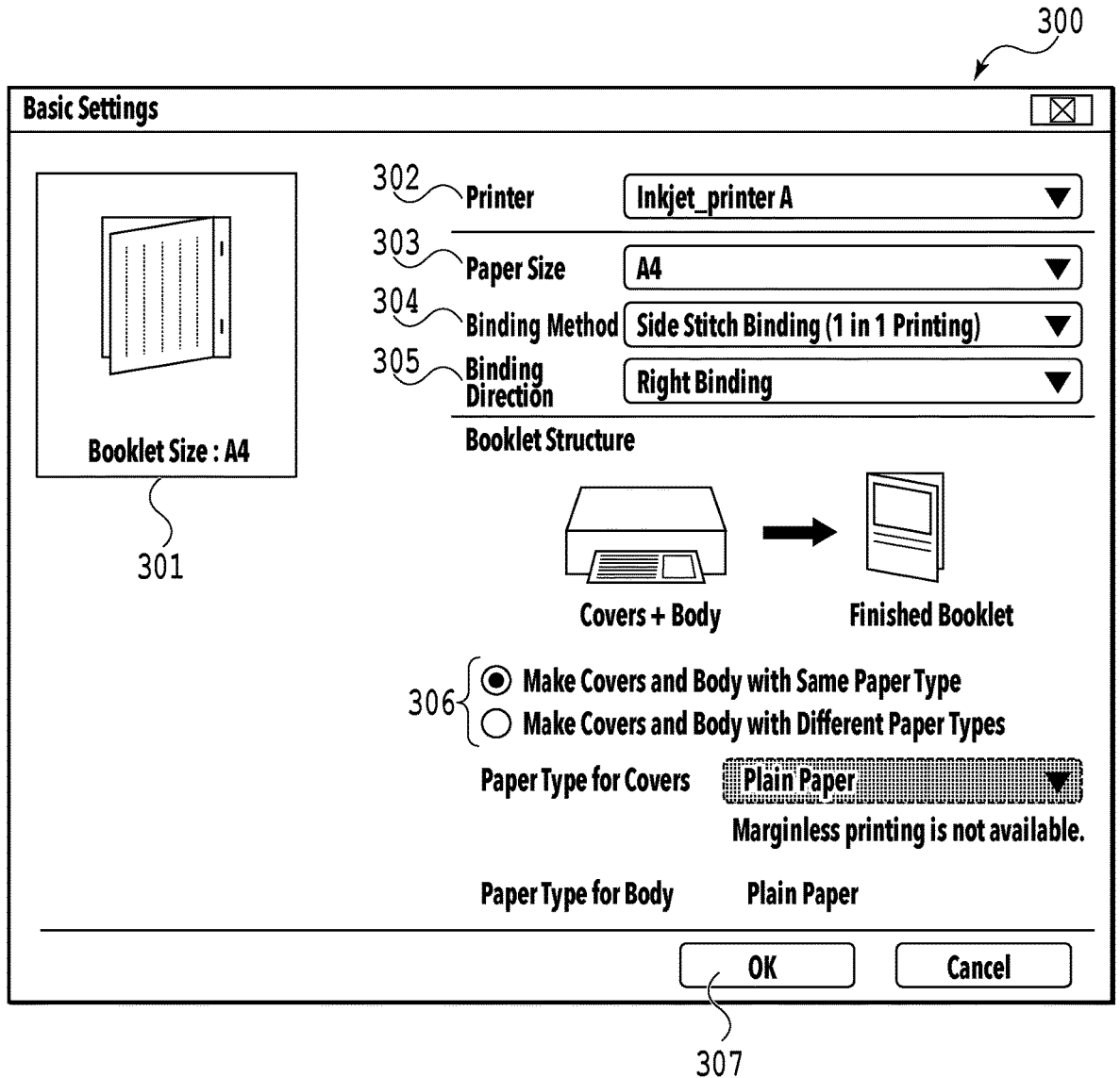
FIG. 3 is a diagram illustrating an example of a basic setting screen in a bookbinding application.

FIG. 3 is a diagram illustrating an example of a basic setting screen 300 displayed on the display unit 108 by, for example, the CPU 103 of the information processing apparatus 101 executing a program stored in the ROM 104 or the external storage 106 and corresponding to the bookbinding application 201. An example of a procedure of a bookbinding operation by the above bookbinding application 201 will now be described. The basic setting screen 300 includes, for example, an expected representation 301 after bookbinding, printer selection region 302, paper size selection region 303, binding method setting region 304, binding direction setting region 305, cover paper sheet setting region 306, and "OK" button 307.

The printer selection region 302 is a region for selecting the printing apparatus 151 to be used. In a case where the pull-down button in the printer selection region 302 is pressed by a user operation, a list of printing apparatuses 151 which the information processing apparatus 101 can use is displayed. Thus, the user can select the printing apparatus 151 to be used to create a booklet with this bookbinding application 201. The list of printing apparatuses 151 displayed by pressing the pull-down button in the printer selection region 302 can display only printing apparatuses 151 compatible with the bookbinding application 201. However, the list is not limited to the above and may display, for example, all printing apparatuses 151 which the information processing apparatus 101 can use, regardless of whether they are compatible with the bookbinding application 201.

The paper size selection region 303 is a region for selecting the size of the paper sheets to be used in the bookbinding. In a case where the pull-down button in the paper size selection region 303 is pressed by a user operation, a list of paper sizes which the printing apparatus 151 selected in the printer selection region 302 can use is displayed. The user can select one size corresponding to the size of the booklet to be created from the displayed list of paper sizes. Information on the paper sizes which the printing apparatus 151 selected in the printer selection region 302 can use can be obtained from that printing apparatus 151 via the printer driver 202, for example.

The binding method setting region 304 is a region for setting the method of binding the booklet. In a case where the pull-down button in the binding method setting region 304 is pressed by a user operation, "side stitch binding" and "saddle stitch binding" are displayed in a selectable manner, for example. "Side stitch binding" is a binding method in which a plurality of print products (paper sheets on which print data is printed) are stacked and folded in half and bound using staples or the like at positions separated from the spine of the booklet by a predetermined distance. "Saddle stitch binding" is a binding method in which a plurality of print products (paper sheets on which print data is printed) are stacked and folded in half and bound using staples or the like at the folds of the paper sheets folded in half. In a case where "saddle stitch binding" is selected, it is assumed that the paper sheets will be folded in half, and a 2-in-1 print setting can therefore be selected automatically. Settings other than a 1-in-1 printing setting, such as a 4-in-1 print setting, may be displayed in a selectable manner in the case where "saddle stitch binding" is selected. In a case where "side stitch binding" is selected, a 1-in-1 print setting can be selected automatically. However, in this case too, settings such as a 2-in-1 printing setting and a 4-in-1 printing setting may be displayed in a selectable manner. In a case where 2 in 1 is not selected for "saddle stitch binding" or 1 in 1 is not selected for "side stitch binding", the page allocation to be described later will be different accordingly.

The binding direction setting region 305 is a region for setting the binding direction of the booklet. In a case where the pull-down button in the binding direction setting region 305 is pressed by a user operation, "right binding" and "left binding" are displayed in a selectable manner, for example. "Top binding" may be displayed in a selectable manner if necessary. "Right binding" means such a binding direction that the right side of the front cover is bound. "Left binding" means such a binding direction that the left side of the front cover is bound. Moreover, "Top binding" means such a binding direction that the top side of the covers is bound. The wording "Binding direction" by the binding direction setting region 305 may be replaced with "Opening direction" or the like. Right opening corresponds to right binding, and left opening corresponds to left binding. The setting in this region determines whether the pages of the booklet to be created shift from right to left or from left to right.

The cover paper sheet setting region 306 is a region for setting the paper sheets for the covers. For example, radio buttons are displayed with which the user can select between an item for creating the covers and the body with the same type of paper sheet or an item for creating the covers and the body with different types of paper sheets. In a case of selecting the setting in the setting region 306 for creating the covers and the body with the same type of paper sheet, the type of paper sheet for the body (e.g., "plain paper" or the like) is set as the type of paper sheet for the covers. Thus, a region in which the type of paper sheet for the covers can be selected is grayed out to be not selectable. On the other hand, in a case of selecting the setting in the setting region 306 for creating the covers and the body with the different types of paper sheets, this region in which the type of paper sheet for the covers can be selected is activated. Then, in a case where the pull-down button in the region for selecting the type of paper sheet for the covers is pressed, selectable types of paper sheets (e.g., glossy paper, plain paper, etc.) are listed. Note that, for example, a character string "marginless printing is not available" can be displayed in a case where "plain paper" is selected, and "marginless printing is available" can be displayed in a case where "glossy paper" is selected. Besides the above, necessary information may be set for each type of paper sheet, and a character string corresponding to a type of paper sheet selected by a user operation may be displayed. In the case of selecting the setting for creating the covers and the body with different types of paper sheets, a message such as "You need to set different types of paper to print the covers and the body" may be displayed.

In a case where the "OK" button 307 in the basic setting screen 300 is pressed, the screen transitions to an editing screen. The editing screen can vary depending on the setting items on the binding method, whether to use the same type of paper sheet for the covers and the body, and so on. Now, examples of the editing screens corresponding to these basic settings will be described.

[Case of Creating Covers and Body Using Same Type of Paper Sheet with Side Stitch Binding (1 in 1)]

Figure 4:
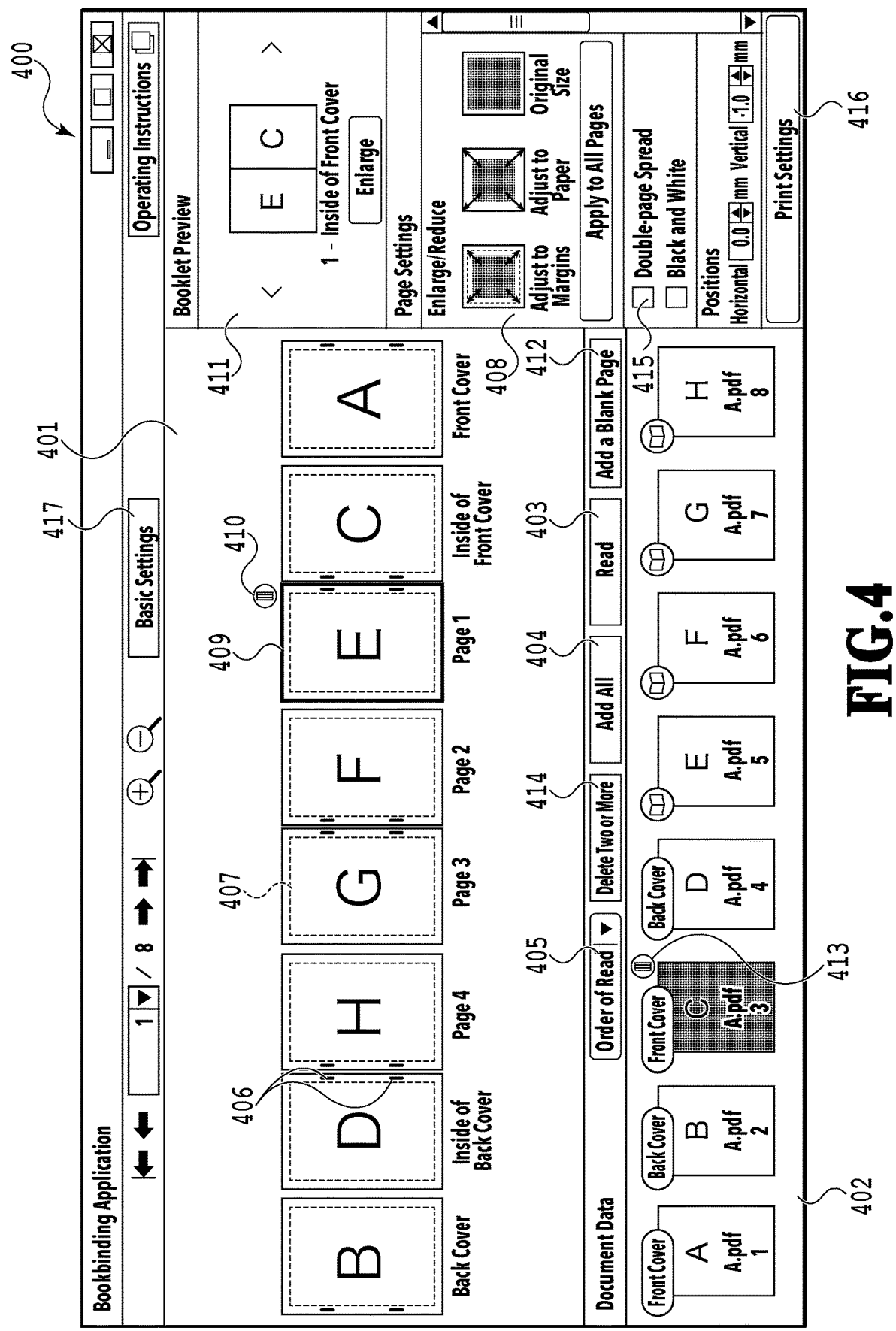
FIG. 4 is a diagram illustrating an example of an editing screen in the bookbinding application.

FIG. 4 is a diagram illustrating an example of an editing screen 400 with settings set such that the binding method is side stitch binding and right binding and the same type of paper sheet will be used for the covers and the body. The editing screen 400 includes an editing region 401, document data region 402, "Read" button 403, "Add All" button 404, pull-down menu 405, binding positions 406, boundary lines 407, page setting region 408, and page frames 409. The editing screen 400 also includes an icon 410, booklet preview 411, "Add a Blank Page" button 412, icon 413, "Delete Two or More" button 414, and "Double-page Spread" checkbox 415. The editing screen 400 further includes a "Print Settings" button 416 and a "Basic Settings" button 417.

Note that FIG. 4 illustrates an example of a state where a document including eight pages (from the page marked "A" to the page marked "H") has already been read. Before the document is read, the editing region 401 and the document data region 402 are in a predetermined state where the user can recognize that no document has been read (e.g., blank state). Before the document is read, for example, a message such as "Please read the document data to be included in the booklet" or the like may be displayed in the editing region 401. In addition, a message indicating how to read the data to the user may be displayed. Such messages may be displayed in the document data region 402. Alternatively, another method such as displaying a dialogue may be used to prompt the user to read the document data.

In a case where the user presses the "Read" button 403, a file selection dialogue is displayed, for example. The user selects a file to be used to create the booklet from a list of files displayed. In response to selecting a file, the contents of that file are loaded in the document data region 402. Moreover, in the editing region 401 is displayed the result of automatic page allocation performed in the order of the pages included in the file. The automatic page allocation can be performed such that, for example, the pieces of data of the first to fourth pages in the file are "front cover", "back cover", "the back surface (inside) of the front cover", and "the back surface (inside) of the back cover", respectively, and the pieces of data of the subsequent pages will be the body. The editing region 401 in FIG. 4 represents an example of a case where automatic page allocation has been performed as above. In the loaded file, the piece of data marked "A", representing the first page, is set as the front cover, and the piece of data marked "B", representing the second page, is set as the back cover. The piece of data marked "C", representing the third page, is set as the inside of the front cover, and the piece of data marked "D", representing the fourth page, is set as the inside of the back cover. Alternatively, the pieces of data of the first and second pages in the file may be allocated to "front cover" and "the inside of the front cover", respectively, and the pieces of data of the last and second last pages in the file may be allocated to "back cover" and "the inside of the back cover" respectively. FIG. 4 illustrates an example of a case with right binding, so that the front cover is displayed at the right end and the back cover is displayed at the left end. In a case where left binding has been selected, the front cover is displayed at the left end and the back cover is displayed at the right end.

Loading the contents of the file in the document data region 402 may be accompanied by displaying a confirmation message such as "Do you want to perform automatic page allocation?", for example, and receiving the user's decision on whether to automatically allocate the pages. In this case, if the user accepts the automatic page allocation, the result of the automatic page allocation will be displayed in the editing region 401. If the user does not accept the automatic page allocation, the editing region 401 may remain blank. Alternatively, the contents of the selected file may just be loaded in the document data region 402 without performing automatic page allocation regardless of the user's decision. Even in the case where automatic page allocation is not performed, the pieces of data can be automatically allocated in the order of the pages included in the file if the user presses the "Add All" button 404.

In a case where a plurality of files are read out, the contents of those files are all loaded in the document data region 402. At this time, the order of loading of the documents can be determined with the pull-down menu 405. For example, in a case where "Order of Read" is selected as illustrated in FIG. 4, the data in the files are loaded in the document data region 402 in such an order that the earlier the file is selected, the closer its data are displayed to the left end. On the other hand, in a case where, for example, "Order of File Name" (not illustrated) is selected, the pieces of data are loaded in ascending (or descending) order of file name. For example, suppose that a file with a name "A.pdf" is opened after a file with a name "B.pdf". In this case, with "Order of Read", the data of "A.pdf" are displayed to the right of where the data of "B.pdf" are displayed. On the other hand, with "Order of File Name", the data of "B.pdf" are displayed to the right of where the data of "A.pdf" are displayed, although "B.pdf" was opened first. The arrangement orders are not limited to the order of read and the order of file name. It is possible to use various orders such as the order of date of file creation (date of file update) and the order of frequency of use in the application, for example.

In the editing region 401, pieces of document data (image data) are displayed which are allocated in the order in which they will be displayed as the pages of the booklet in the complete form are flipped. Moreover, the pieces of document data (image data) are displayed such that the distance between each two pages which are displayed as a double-page spread is shorter than the distance between other pages which are adjacent to each other but are not displayed as a double-page spread. In this way, the user can easily discriminate the pages in the booklet which appear as a double-page spread and the pages which do not appear so. In the example of FIG. 4, the distance between the pages marked "C" and "E" is sufficiently short, indicating that these pages form a double-page spread together. On the other hand, the distance between the pages marked "E" and "F" is longer, indicating that these pages are adjacent to each other but do not form a double-page spread together. All pages to be included in the booklet are displayed in this manner in the editing region 401. FIG. 4 illustrates an example of a case where all pages to be included in the booklet are displayed. Increasing the number of pages while maintaining the state of displaying all pages as above may reduce the size of each page. Thus, the bookbinding application 201 can be configured to be capable of enlarging and shrinking each displayed page. Here, in a case where not all pages can be displayed in the editing region 401, the display range can be made movable by, for example, displaying a scrollbar at a lower portion of the editing region 401.

Incidentally, in the case where side stitch binding is selected, the binding positions 406 are also displayed with staples. These binding positions 406 are displayed, for example, in a predetermined color (e.g., red) to be recognizable to the user. The displayed binding positions 406 will be printed as they are, and the user can bind the booklet at those positions with staples.

On each page displayed in the editing region 401, there are displayed a boundary line 407 indicating a boundary between a printable region and a margin region. In a case where the user inputs setting values in regions in the page setting region 408, a piece of document data is arranged in the corresponding page based on those setting values. For example, in the page setting region 408, the user sets whether to enlarge or shrink a piece of document data according to the margin and the paper sheet or to display the piece of document data in the original size, as well as its top-bottom and left-right positions. The top-bottom and left-right positions are for example such that a negative value shifts the position of the piece of document data in the page upward or leftward, and a positive value shifts the position of the piece of document data in the page downward or rightward. In this way, the user can specifically set the arrangement of a piece of document or image data within the corresponding page. These settings can be applied on a per-page basis. For example, in a case where setting values are input in the page setting region 408 while the page marked "E" is selected in the editing region 401, those setting values are applied only to this selected page. Meanwhile, selecting "Apply to All Pages" in the page setting region 408 will apply the input settings collectively to all pages. At this time, the page frame 409 of the page marked "E" is highlighted. In this way, the user can recognize the selected page and thus notice that the user is configuring settings of that particular page. The user can also delete this page from the editing region 401 by pressing the icon 410, for example. The user can also check the "Double-page Spread" checkbox 415 to allocate a single piece of data as a double-page spread.

After completing the editing processing with the editing screen 400 or an editing screen 500 (described later), the user selects the "Print Settings" button 416. Using a print setting screen 600 (described later) selected by selecting the "Print Settings" button 416, the user performs further print setting processing and selects execution of printing. By these processes, the application data generated by the bookbinding application 201 is sent to the printer driver 202 compatible with the printer selected in FIG. 3, and the printer driver generates print data based on the application data. In a case of printing the covers and the body with the same type of paper sheet, the application data includes both the pages to be arranged as the covers and the pages to be arranged as the body. On the other hand, in a case of printing the covers and the body with different types of paper sheets, the covers and the body will be printed separately. For this reason, the print setting screen 600 provides options so that the covers or the body can be selected as the print target. Here, in a case where the user issues a print instruction with the covers selected, the application data includes only the pages to be arranged as the covers, and the printer driver 202 generates print data of the covers. On the other hand, in a case where the user issues a print instruction with the body selected, the application data includes only the pages to be arranged as the body, and the printer driver 202 generates print data of the body.

Figure 5:
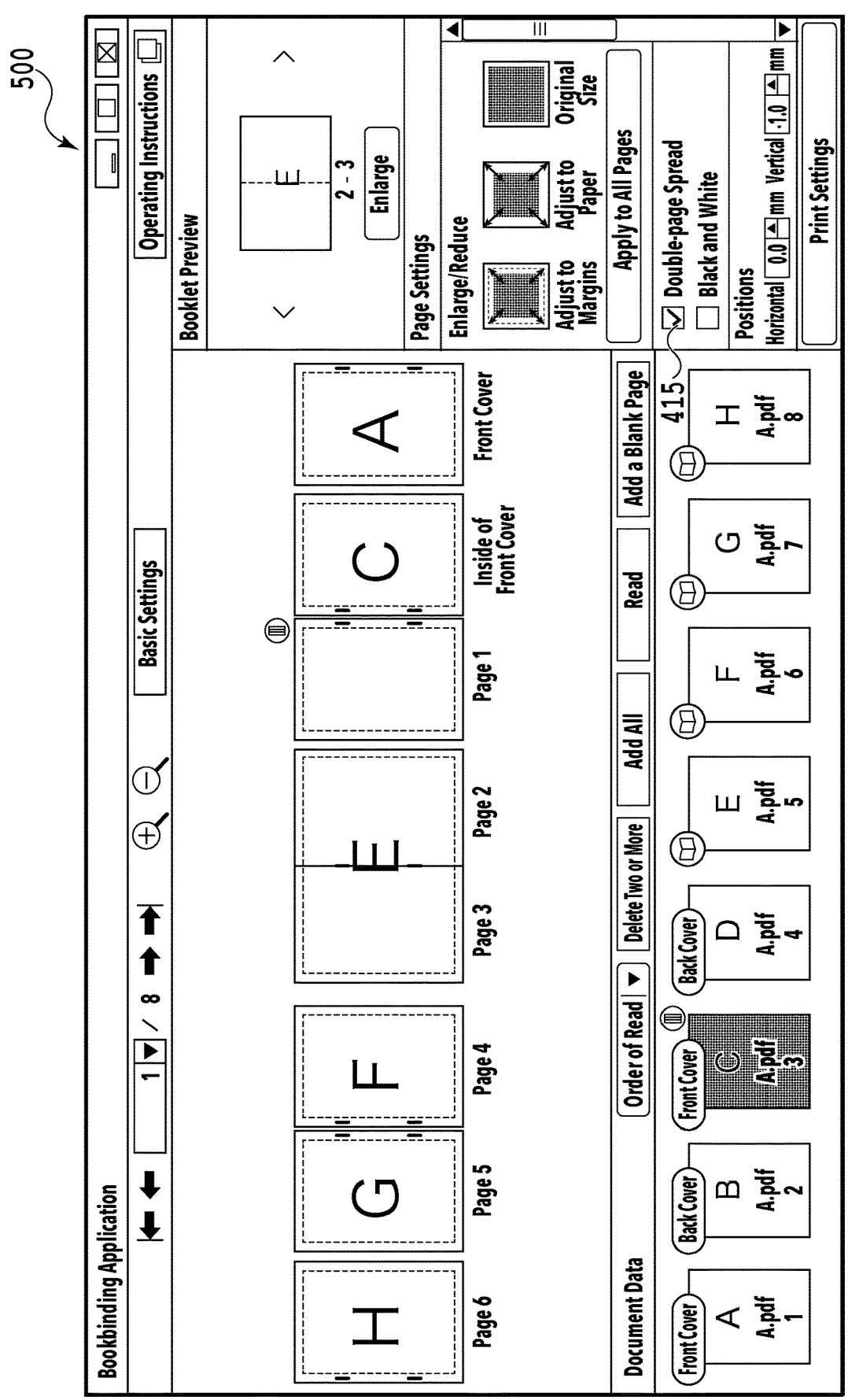
FIG. 5 is a diagram illustrating an example of an editing screen in the bookbinding application.

FIG. 5 is a diagram illustrating an example of a display in a case where the "Double-page Spread" checkbox 415 is checked while the page marked "E" illustrated in FIG. 4 is selected. In response to checking the "Double-page Spread" checkbox 415, the selected page is allocated to two pages. In a case where the "Double-page Spread" checkbox 415 is checked while an even-numbered page in the body (the right page of a double-page spread for right binding, and the left page of a double-page spread for left binding) is selected, the selected page is displayed at the center of a double-page spread. Then, the pages after that page are reallocated so as to shift by one page toward the back. Specifically, in this case, a single page is added after the selected page, and the single selected page is allocated as a double-page spread.

On the other hand, in a case where an odd-numbered page in the body (the left page of a double-page spread for right binding, and the right page of a double-page spread for left binding) is selected, like the page marked "E" in FIG. 4, the page immediately after the selected page is a page in a double-page spread different from that of the selected page. Thus, simply adding a single page after the selected page and allocating the single selected page to the two-page region cannot display that page as a double-page spread. For this reason, in a case where the "Double-page Spread" checkbox 415 is checked while an odd-numbered page in the body is selected, a single page can be added not only after but also before the selected page, as illustrated in FIG. 5, for example. This enables the selected page to be reliably allocated as a double-page spread. In this case, the pages after the selected page are reallocated so as to shift by two pages toward the back.

In the case where the "Double-page Spread" checkbox 415 is checked while an odd-numbered page is selected, a message may be displayed as a notification for the user indicating that a single page will be added before the selected page. Then, in a case where the user accepts the addition of a page, the process of allocating the selected page as a double-page spread may be executed. This prevents addition of a page not intended by the user. In a case where the user does not accept the addition of a page, the process of allocating the selected page as a double-page spread may be omitted. Alternatively, a one-page space may be added after the selected page, and the selected page may be allocated to the two-page region. Still alternatively, in the case where the "Double-page Spread" checkbox 415 is checked while an odd-numbered page is selected, the displaying of a message as mentioned above may be omitted, a one-page space may be added after the selected page, and the selected page may be allocated to the two-page region. Note that, in the case of performing such allocation, a message indicating that the selected page will not be printed as a double-page spread without adding a page before the selected page may be displayed.

Unchecking the "Double-page Spread" checkbox 415 after a page is allocated as a double-page spread deletes the (preceding and/or following) page added at the time of allocating that page as a double-page spread. Then, the pages after the page are reallocated. A message may be displayed which indicates, for example, whether the pages, such as blank pages, added at the time of laying out an odd-numbered page as a double-page spread may be deleted.

In a case where a piece of landscape document data is dragged and dropped (or automatically allocated) in the editing region 401 (see FIG. 4), a process of automatically allocating it as a double-page spread may be performed. In this case, the "Double-page Spread" checkbox 415 is automatically checked. In a case where this page is inserted at the position of an odd-numbered page, a blank page or the like may be inserted before that page, as described above, or a predetermined error display or the like may be presented. Unchecking the "Double-page Spread" checkbox 415 after the landscape page is allocated as a double-page spread can cancel its allocation as a double-page spread and allocate the landscape page on either page (e.g., by shrinkage or rotation). Instead of automatically allocating the landscape page as a double-page spread, it may be allocated on either page, as with portrait pages. Referring back to FIG. 4, an expected representation of the double-page spread including the selected page after the bookbinding is displayed as the booklet preview 411. In this way, the user can easily recognize the state of the selected page after the completion of the booklet. Selecting a left arrow 411a or right arrow 411b in the preview can display a preview of an adjacent double-page spread. At this time, the selected page may be synchronously shifted, or only the preview may be shifted to other pages without the selected page synchronized with the preview.

The user can handle the data loaded in the document data region 402 on a per-page basis. For example, the user can select and drag and drop one page in the data into the editing region 401 to add that page as one page in the booklet. FIG. 4 illustrates a state where the page marked "C" in the data loaded in the document data region 402 is selected. In a case where a page thus selected is dragged and dropped at any position in the editing region 401, it is incorporated in the booklet as a page at the drop position. For example, in a case where the above page is dragged and dropped in a predetermined region between the pages marked "F" and "G" in the editing region 401, the page marked "C" is inserted between the "F" and "G" pages. In response to inserting a page as above, the relation between the double-page spreads is reconfigured accordingly. Specifically, the "F" page and the newly added "C" page together form a double-page spread and, due to the addition of the "C" page, the "G" page and "H" page together form a double-page spread.

The user can also add a blank page by pressing the "Add a Blank Page" button 412. For example, in a case where the "Add a Blank Page" button 412 is pressed while the page marked "C" is selected, a blank page is added between the pages marked "C" and "E". Based on a predefined rule, a blank page may be added to the right or left of a selected page, or between two pages in a case where these pages are selected. In this way, a blank page can be added at any position in the booklet, for example, in a case where the user wants the back side of a cover to be blank or based on the user's preference.

In the case where the pieces of data in the document data region 402 are used in the editing region 401, each piece of data is given a piece of information identifying the usage on its upper left corner. FIG. 4 indicates that the pieces of data marked "A" and "C" are used for the front cover (and its back side), the pieces of data marked "B" and "D" are used for the back cover (and its back side), and the other pieces of data are used for the body. In this way, the user can check, for example, whether there is any piece of data that is supposed to be included as a page in the booklet but is not used in the editing region 401, whether there is any piece of data that is not to be included in the booklet but is used, and whether the pieces of data to be used as the covers are appropriate. The user can delete pieces of data in the document data region 402 that are not to be used in the booklet creation. For example, the user can select the icon 413 displayed around the upper right corner of a selected piece of data to delete this selected piece of data from the document data region 402. This prevents complication of the editing work due to the document data region 402 keeping many pieces of data that are not to be used.

A plurality of pieces of data in the document data region 402 can be selected and handled collectively. For example, the pieces of data representing the pages marked "C" and "D" may be collectively selected, and dragged and dropped together into the editing region 401. In this way, these pieces of data can be included as two continuous pages in the booklet. This applies similarly to a case of selecting three or more pieces of data. Moreover, pressing the "Delete Two or More" button 414 with the plurality of pieces of data selected deletes these pieces of data collectively from the document data region 402. The "Delete Two or More" button 414 can be disabled by, for example, being grayed out in a case where only a single piece of data is selected or no data is selected.

After completing editing the booklet as described above, the user can press the "Print Settings" button 416 to execute the printing of the booklet. In the case of side stitch binding (1 in 1), double-sided printing is performed such that the (2n−1)-th page and the 2n-th page (n is an integer of 1 or more) will be on the front and back sides of a paper sheet, respectively. Moreover, the double-sided printing is performed such that the front cover and its back side will be the front and back sides of a paper sheet, and the back cover and its back side will be the front and back sides of a paper sheet, respectively.

(General Description of Print Settings)

Figure 6:
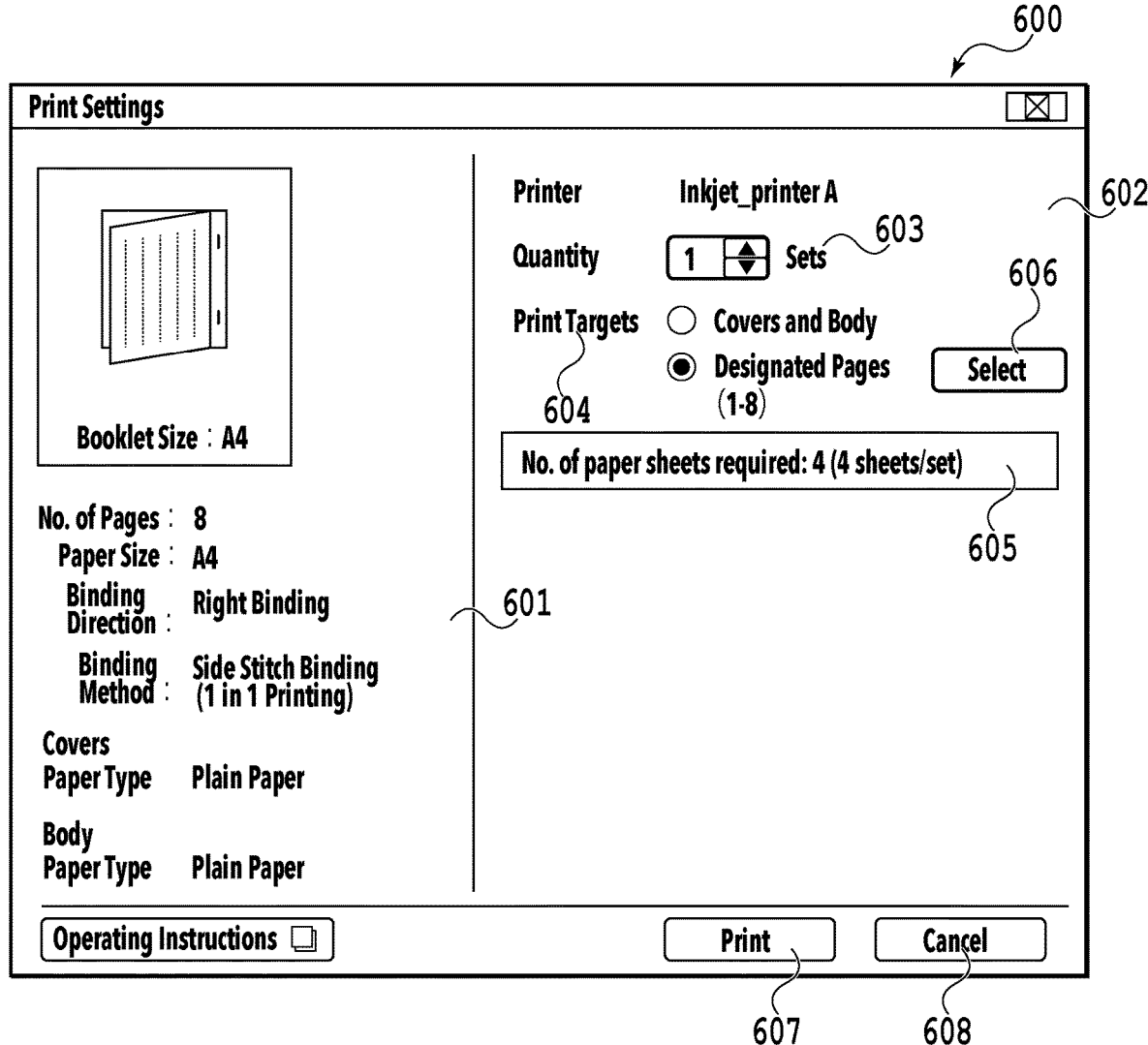
FIG. 6 is a diagram illustrating an example of a print setting screen in the bookbinding application.

FIG. 6 is a diagram illustrating an example of the print setting screen 600 displayed in a case where the "Print Settings" button 416 (see FIG. 4) is selected with basic settings as illustrated in FIG. 3 selected. The print setting screen 600 includes regions 601 and 602, a print quantity setting region 603, a region 604 for setting the print targets, a region 605 for displaying the number of paper sheets required, a "Select" button 606, and the "Print" button 607. The regions 601 and 602 are regions for presenting the information set on the basic setting screen 300 in FIG. 3. To change the information in the regions 601 and 602, the user presses a "Cancel" button 608 to return to the editing screen 400. The user then presses the "Basic Settings" button 417 in the editing screen 400 to return to the basic setting screen 300 in FIG. 3. The user can then perform a process of changing the basic settings. The print quantity setting region 603 is a region for setting the number of booklets to be created. The region 604 is a region for setting whether to print the entire body and covers or to print only some of the pages. For example, the user can select the radio button for "Covers and Body" to collectively print all pages. In the case where the body and the covers are to be created with different types of paper sheets, the display of "Covers and Body" is separated into two items "Covers" and "Body". In this way, the user can select between a mode for collectively printing the entire body (not printing the covers) and a mode for collectively printing all covers (not printing the body). Alternatively, the user can select the radio button for "Designated Pages" to print only some of the pages. Note that the numerical values "(1-8)" shown to the right of "Designated Pages" indicate the number of pages in the booklet. In the illustrated example, the first to eighth pages are indicated as the print target range. The number of paper sheets is determined according to the total number of pages, the binding method, and so on, and that information is displayed in the region 605. In this way, the user can recognize the number of paper sheets that should be set in the printing apparatus 151. In a case where the "Select" button 606 is pressed, a first setting screen 700 (see FIG. 7) is displayed.

Figure 7:
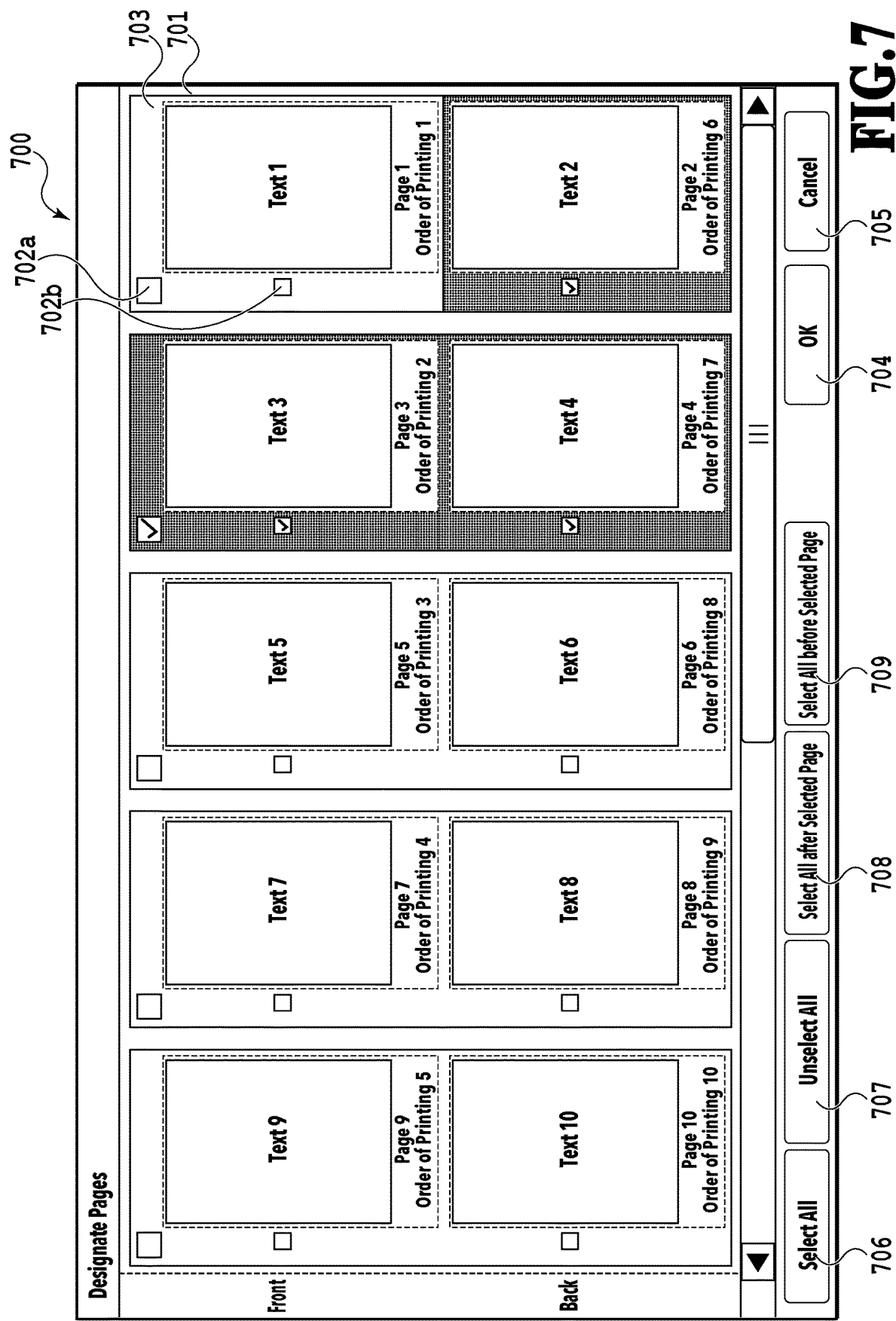
FIG. 7 is a diagram illustrating an example of a setting screen for page-designated printing.

FIG. 7 is a diagram illustrating an example of the first setting screen 700 for performing page-designated printing in the present embodiment. The first setting screen 700 includes frames 701 each representing a sheet as a paper sheet on which previewed pieces of page data are to be printed. Moreover, the first setting screen 700 includes first checkboxes 702a as first interfaces, second checkboxes 702b as second interfaces, regions 703, an "OK" button 704, and a "Cancel" button 705. Furthermore, the first setting screen 700 includes a "Select All" button 706, an "Unselect All" button 707, a "Select All after Selected Page" button 708, and a "Select All before Selected Page" button 709. For the sake of description, assume that the number of pages in the body of the booklet to be created is 10 pages in FIG. 7. Moreover, the following description will be given on the assumption that manual double-sided printing is performed with side stitch binding and right binding in FIG. 7.

The manual double-sided printing will be briefly described below. In the manual double-sided printing, the pieces of front-surface page data are printed first. Thus, in the present embodiment, since right binding is to be used, "Text 1", "Text 3", "Text 5", "Text 7", and "Text 9", which represent the front-surface pages of the document, are printed in this order. The printing apparatus 151 temporarily stops the print processing and the paper discharge processing in a case where the printing of the pieces of front-surface page data is completed. The printing apparatus 151 then notifies the information processing apparatus 101 that all pieces of front-surface page data have been normally printed. In this case, the information processing apparatus 101, for example, displays a message indicating that all pieces of front-surface page data have been normally printed on the display unit 108. In this way, the user can recognize that all pieces of front-surface page data have been successfully printed. The user then has to manually invert the surfaces of the paper sheets on which the pieces of front-surface page data were printed and the surfaces on which no printing has been performed, and set the paper sheets on the paper feed tray (not illustrated) of the printing apparatus 151 again. Thus, in the present embodiment, in response to the user setting the paper sheets again and performing an operation for printing the pieces of back-surface page data, "Text 2", "Text 4", "Text 6", "Text 8", and "Text 10" are printed in this order. In a case where the printing apparatus 151 is equipped with an automatic double-sided printing function, the manual double-sided printing will be permitted to be executed by enabling the manual double-sided printing. The above is a brief description of the manual double-sided printing.

The first setting screen 700 displays the page layout of each paper sheet (sheet). Specifically, inside the frame 701 of each sheet, the layout of the pieces of page data to be printed on the front and back surfaces of that sheet is displayed so that the user can discriminate the pieces of page data allocated to each sheet. For instance, the example of FIG. 7 indicates that the piece of page data marked "Text 3" is arranged on the front surface of the second sheet from the right, and the piece of page data marked "Text 4" is arranged on the back surface. It is to be noted that "Text X" in FIG. 7 and subsequent drawings is a representation used for convenience and, in reality, a preview screen of the content of the page can be displayed. Specifically, the contents of pieces of page data selected from the document data are displayed. Each preview image displayed in the first setting screen 700 and the like will also be referred to as "sheet preview image" since it represents a print result of a sheet forming the booklet. The sheet preview image is generated based on a plurality of pieces of page data and the print setting information.

In the first setting screen 700, a first checkbox 702a is provided for each frame 701 (i.e. each sheet). The user can select sheets to be printed by checking the corresponding first checkboxes 702a. Moreover, in the first setting screen 700, a second checkbox 702b is provided for each piece of page data. The user can select pages to be printed by checking the corresponding second checkboxes 702b. Each first checkbox 702a is illustrated inside the corresponding frame 701 in FIG. 7, but may be arranged at such a position that the user can recognize its association with the frame 701, such as a predetermined position vertically or horizontally outward of the frame 701 or a predetermined position on the line of the frame 701. Also, each second checkbox 702*b* is illustrated to the left of the corresponding piece of page data in FIG. 7, but may be arranged at such a position that the user can recognize its association with the piece of data, such as a predetermined position vertically or horizontally outward of the piece of page data or a predetermined position on the line of the piece of page data. The first and second checkboxes 702*a* and 702*b* are a mere example, and other interfaces may be used such as buttons with which the user can easily select the sheets and the pieces of page data. The first and second checkboxes 702*a* and 702*b* may of course be different types of interfaces. In response to checking any of the first checkboxes 702*a*, a predetermined display for making the selection easily recognizable can be presented, such as changing the color of the region in the frame 701 corresponding that first checkbox 702*a*. Similarly, in response to checking any of the second checkboxes 702*b*, a predetermined display for making the selection easily recognizable can be presented, such as changing the color of the region in the piece of page data corresponding that second checkbox 702*b*. In the example of FIG. 7, the colored regions 703 highlight the selection of the piece of page data of the second page ("Text 2") and the second sheet from the right (the sheet including the pieces of page data of "Text 3" and "Text 4"). Pressing the "OK" button 704 applies the setting for printing the selected pages and sheets to the print setting screen 600. Then, in a case where the "Print" button 607 in the print setting screen 600 is pressed, the selected pages and sheets are printed. In other words, the "Print" button 607 is a button for causing the printing apparatus 151 to print the selected pages and sheets. Note that, in response to selecting pages and sheets to be printed, the information displayed in the region 605 can be changed according to the number of those pages and sheets. In this way, the user can be notified of the correct number of paper sheets to be required in the printing. In a case where the "Cancel" button 705 in the first setting screen 700 is pressed, then, even if pages and sheets have been selected, the screen returns to the print setting screen 600 without applying the selection.

On the first setting screen 700, a plurality of sheets can be collectively selected. For example, in a case where the user presses the "Select All" button 706, the displayed first and second checkboxes 702*a* and 702*b* become checked. The user can, for example, uncheck some of the sheets in this state to collectively set many sheets as print targets without having to individually check their first or second checkboxes 702*a* or 702*b*. Moreover, the user can press the "Unselect All" button 707 to uncheck first and second checkboxes 702*a* and 702*b* that are checked. This brings the screen to an initial state where none of the sheets or the pieces of page data is selected, and the user can reselect the sheets or pieces of page data to be printed. The user can also press the "Select All after Selected Page" button 708 to collectively select the sheets after the focused page. For example, suppose that the user presses "Select All after Selected Page" button 708 in FIG. 7 while the sheet including the page marked "Text 6" is selected. In this case, the second checkboxes 702*b* for "Text 6", "Text 8", and "Text 10" become checked. This makes it possible to easily select print targets, for example, in a case where a page and those after it failed to be printed due to a paper jam, a lack of ink, or the like and the pages other than those in the successfully printed part are to be reprinted.

Similarly, the user can press the "Select All before Selected Page" button 709 to collectively select the sheets before the focused page. For example, suppose that the user presses "Select All before Selected Page" button 709 in FIG. 7 while the page marked "Text 6" is selected. In this case, the first checkbox 702*a* for the sheet corresponding to "Text 3" and "Text 4", and the first checkbox 702*a* for the sheet corresponding to "Text 1" and "Text 2" become checked. Moreover, the second checkboxes 702*b* for "Text 9", "Text 7", and "Text 5" become checked. This makes it possible to easily select print targets, for example, in a case where an early page in the document data failed to be printed, and the page that failed to be printed is to be reprinted. In sum, the user can select print targets on a per-sheet basis by using the first checkboxes 702*a* and also select print targets on a per-page basis by using the second checkboxes 702*b*.

[Case Where Error Occurs During Printing]

In a case where an error (e.g., a paper jam) occurs during printing, the printing apparatus 151 suspends the print processing. Here, even if sheet preview images are displayed on the display unit 108 when the printing is suspended, the pieces of page data will not necessarily be printed in the order of the pages. For example, in manual double-sided printing, printing the "Text 1" (page 1) on a front surface is not followed by printing "Text 2" (page 2) on a back surface but by printing "Text 3" (page 3) on a front surface. For this reason, in a case where an error occurs during printing, it may be difficult for the user to recognize which sheets and pieces of page data to reprint. Here, if the user manually selects a wrong sheet or piece of page data, the paper sheet that was successfully printed may be wasted. For instance, suppose that a paper jam occurs while the piece of page data of "Text 3" is printed in the above example. In this case, the piece of page data of "Text 1" has been successfully printed. The user should therefore set the piece of page data of "Text 3" as a reprint target. If the user nevertheless manually checks the second checkbox 702*b* for the piece of page data of "Text 1", the paper sheet on which the piece of page data of "Text 1" has been printed will be wasted. To address this, the present embodiment provides a technology capable of improving user-friendliness of printing. Specifically, the present embodiment provides a technology by which, in a case where an error occurs during printing, either or both of the sheets and pieces of page data to be reprinted are displayed in an automatically selected state.

Figure 8:
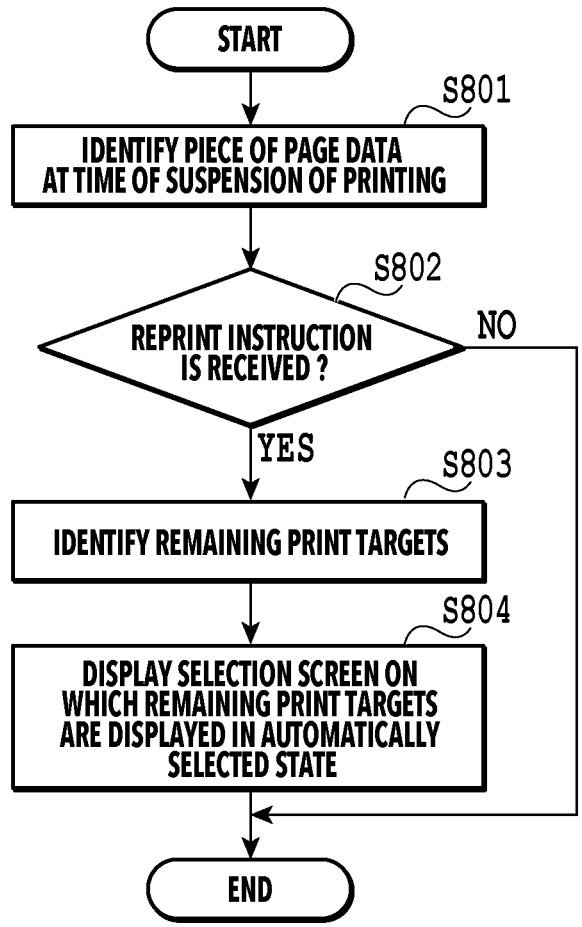
FIG. 8 is a chart illustrating a flow of displaying a selection screen in an embodiment.

FIG. 8 is a flowchart illustrating a procedure from the occurrence of an error during printing of document data until either or both of the sheets and pieces of page data to be reprinted are displayed in an automatically selected state. Assume that the printing apparatus 151 transmits information on the progress of the print processing to the information processing apparatus 101 as the print processing progresses. In this way, the information processing apparatus 101 can recognize the progress of the print processing substantially in real time. For example, in a case of printing a plurality of pages, the information processing apparatus 101 can recognize up to what page the print processing has been completed. Also, as mentioned above, in a case where an error (e.g., a paper jam) occurs during the printing, the printing apparatus 151 suspends the print processing. After suspending the print processing, the printing apparatus 151 notifies the information processing apparatus 101 that the print processing has been suspended. In response to receiving this notification, the information processing apparatus 101 starts the processing illustrated in FIG. 8. In the present embodiment, the number of pages in the body is 10 pages. The document data is subjected to manual double-sided printing with side stitch binding and right binding. The following description will be given on the assumption that a paper jam occurs during printing of the piece of page data of "Text 3", which represents a front-surface page, under the above conditions. Note that "S" attached to each step number in the flowchart illustrated in FIG. 8 means a step. Moreover, the CPU 103 included in the information processing apparatus 101 implements the processes in the flowchart illustrated in FIG. 8 by reading out the bookbinding application 201 into the RAM 105 and executing it.

In S801, the CPU 103 identifies the piece of page data that was being printed at the time of suspending the print processing based on the information on the progress transmitted from the printing apparatus 151. In a case where an error occurs between the completion of the print processing of a predetermined piece of page data (first page data) and the start of the print processing of second page data to be printed next, the error is considered to have occurred during the printing of the second page data. In other words, the print processing of the first page data is considered to have been successfully done.

In S802, the CPU 103 determines the subsequent processing based on whether a reprint instruction has been received from the user. If a reprint instruction has been received from the user, the CPU 103 proceeds to S803. On the other hand, if no reprint instruction has been received from the user, the CPU 103 terminates the flow. In S803, the CPU 103 identifies the remaining print targets based on the piece of page data identified in S801. Details of this step will be described later with FIG. 9. In S804, the CPU 103 executes a process of displaying the first setting screen 700 presenting the remaining print targets in an automatically selected state. Specifically, in this step, preview images of the pieces of page data that were not printed are displayed in an automatically selected state. Details of the first setting screen 700 in this step will be described later with FIG. 10. After finishing the process of this step, the CPU 103 terminates the flow. The above is a procedure from the occurrence of an error during printing of document data until the remaining print targets are displayed in an automatically selected state.

Figure 9:
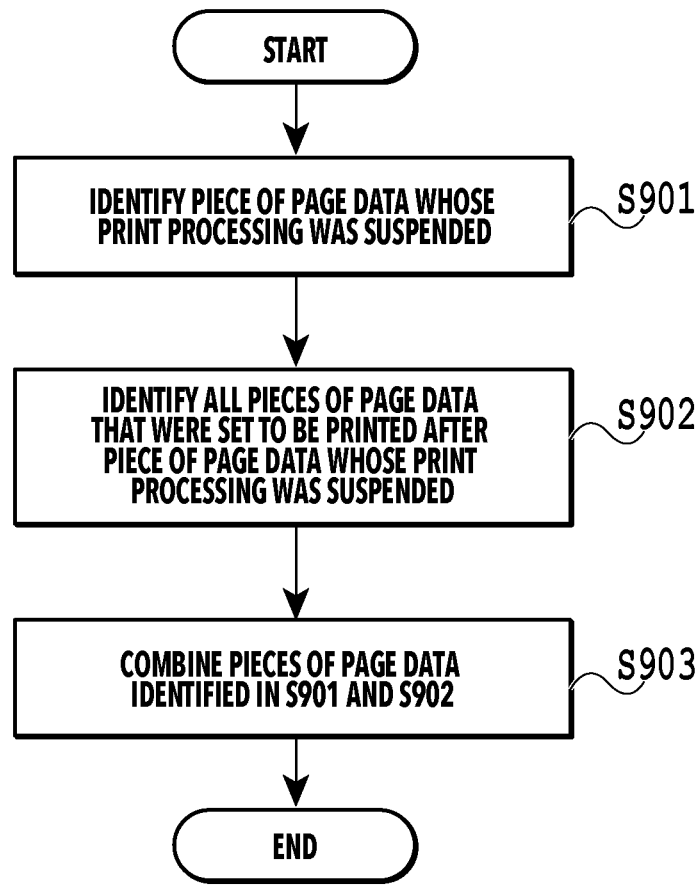
FIG. 9 is a chart illustrating a flow of identifying a piece of page data to be reprinted.

FIG. 9 is a chart for describing details of the process of identifying the remaining print targets (S803 mentioned above). In S901, the CPU 103 identifies the page data marking one page of a plurality of pages in document data to be subjected to printing whose print processing was suspended, which was identified in S801. This makes it possible to identify the piece(s) of page data that was(were) printed (i.e., successfully printed) and the piece of page data that was not printed (i.e., failed to be printed). In the present embodiment, the piece of page data of "Text 1" is identified as the piece of page data that was successfully printed. On the other hand, the piece of page data of "Text 3" is identified as the piece of page data that failed to be printed. In S902, the CPU 103 identifies all pieces of page data supposed to be printed after the piece of page data having failed to be printed. In the present embodiment, the pieces of page data of "Text 5", "Text 7", "Text 9", "Text 2", "Text 4", "Text 6", "Text 8", and "Text 10" are identified. In S903, the CPU 103 combines the piece of page data having failed to be printed and the pieces of page data that were set to be printed after the piece of page data that failed to be printed. In sum, in this step, all pieces of page data that were not printed due to the suspension of the print processing are identified among the pieces of page data in the document data to be subjected to the bookbinding printing. The bookbinding printing in the present embodiment is printing for making a book as an output result by saddle stitch binding, side stitch binding, or the like.

As a result, the piece of page data that does not have to be reprinted, the piece of page data that should be reprinted, and the pieces of page data that have not been printed are identified. In the present embodiment, the piece of page data of "Text 1" is identified as one not to be reprinted. On the other hand, the piece of page data of "Text 3" is identified as one to be reprinted. Moreover, the pieces of page data of "Text 5", "Text 7", "Text 9", "Text 2", "Text 4", "Text 6", "Text 8", and "Text 10" are identified as ones to be printed. In sum, in this step, of the plurality of pieces of page data in the booklet data to be subjected to the print processing, the piece of page data that was printed, and the pieces of page data that were not printed due to suspension of the print processing are identified.

Figure 10:
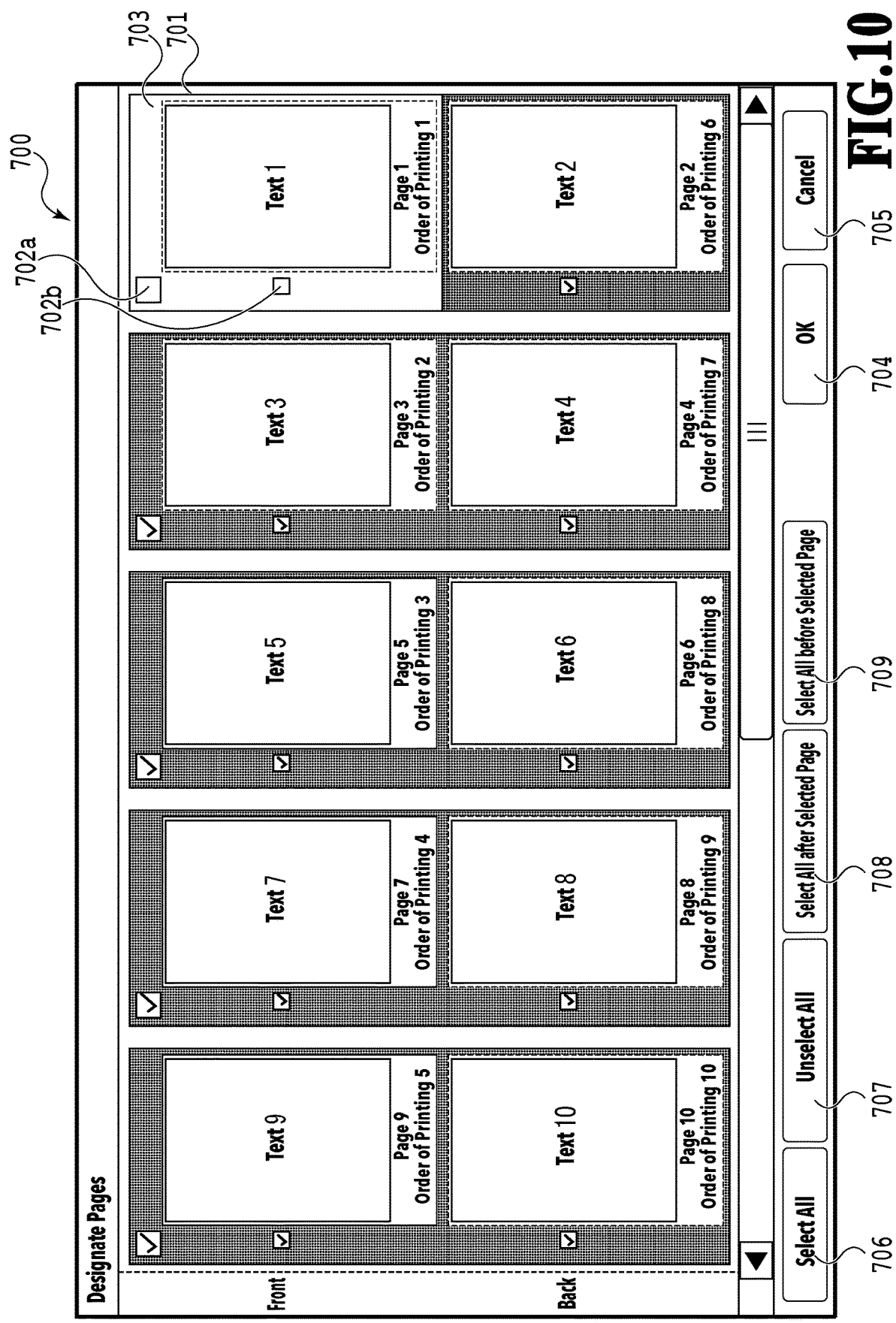
FIG. 10 is a diagram illustrating an example of the setting screen for page-designated printing.

FIG. 10 illustrates an example of the first setting screen 700 displayed in a case where an error occurs during printing. As illustrated in FIG. 10, in the present embodiment, in a case where an error occurs during printing, preview images of the pieces of page data not printed due to the resultant suspension of the print processing are displayed in an automatically selected state on the display unit 108 (see FIG. 1). For example, in a case where an error occurs during printing of the piece of page data of "Text 3", the preview images representing the piece of page data of "Text 3" and those after it are displayed with all second checkboxes 702b on their left checked.

Moreover, in the example of FIG. 10, the pieces of page data that were not printed are displayed in a highlighted state as compared to the piece of page data that was printed. In contrast, the piece of page data that was printed is displayed in a suppressed fashion compared to the pieces of page data that were not printed. For example, the region 703 for the piece of page data of "Text 3", which is to be reprinted, is colored and thus is displayed in a highlighted state as compared to the piece of page data of "Text 1", which is not to be reprinted. On the other hand, the region 703 for the piece of page data of "Text 1", which is not to be reprinted, is not colored and thus is displayed in a suppressed fashion compared to the region 703 for the piece of page data of "Text 3", which is to be reprinted. Moreover, in the example of FIG. 10, the order of printing of the piece of page data that was printed and the pieces of page data that were not printed is displayed. Specifically, the order of printing of each piece of page data is displayed. This example shows that "Text 1", "Text 3", "Text 5", "Text 7", "Text 9", "Text 2", "Text 4", "Text 6", "Text 8", and "Text 10" are printed in this order. Note that the piece of page data of "Text 1" was successfully printed in this example. Hence, the piece of page data of "Text 1" is not to be reprinted, but the order of printing is displayed. This is to make it easier for the user to recognize the order of printing of all pieces of page data.

With the information processing apparatus 101 according to the present embodiment, the user can recognize pieces of page data to be reprinted without having manually selecting these pieces of page data to be reprinted. This makes it easier for the user to print the pages to be printed after the occurrence of an error. That is, the information processing apparatus 101 according to the present embodiment can improve user-friendliness of printing.

[Case of Creating Booklet by Saddle Stitch Binding (2 in 1)]

A description will now be given of a case of creating a booklet by manual double-sided printing from document data with saddle stitch binding and right binding. In this case, in response to the user pressing the "Print" button 607 (see FIG. 6), a second setting screen 1100 (see FIG. 11) for performing page-designated printing of the document data with saddle stitch binding and right binding is displayed.

Now, the difference between the editing screens 400 (see FIG. 4) and 500 (see FIG. 5) and the second setting screen 1100 will be described. The editing screens 400 and 500 include page preview images that are based on pieces of page data arranged in the order in which the pages of a booklet in a printed form will appear as the user flips each page. On the other hand, the second setting screen 1100 includes sheet preview images representing the result of laying out pieces of page data on sheets in such a way that the contents of the pieces of page data will appear in the order of the pages of a booklet in a printed form as the user flips each page. Thus, in a case where, for example, side stitch binding is set, the page preview images in the editing screens 400 and 500 are arranged in the order in which the pages of the booklet in a printed form will appear as the user flips each page (i.e., in the order of the first page, the second page, . . . ). On the other hand, in a case where saddle stitch binding is set, the pieces of page data in the second setting screen 1100 are laid out on the sheets in an order different from the order in which the pages of the booklet in a printed form will appear as the user flips each page (i.e., in the order of the first page, the second page, . . . ). For example, the pieces of page data of the 1st and 12th pages are laid out on the front surface of the 1st sheet. The pieces of page data of the 2nd and 11th pages are laid out on the back surface of the 1st sheet. The preview images displayed on the editing screens 400 and 500 and those on the second setting screen 1100 are different in this manner.

(Second Setting Screen 1100)

Figure 11:
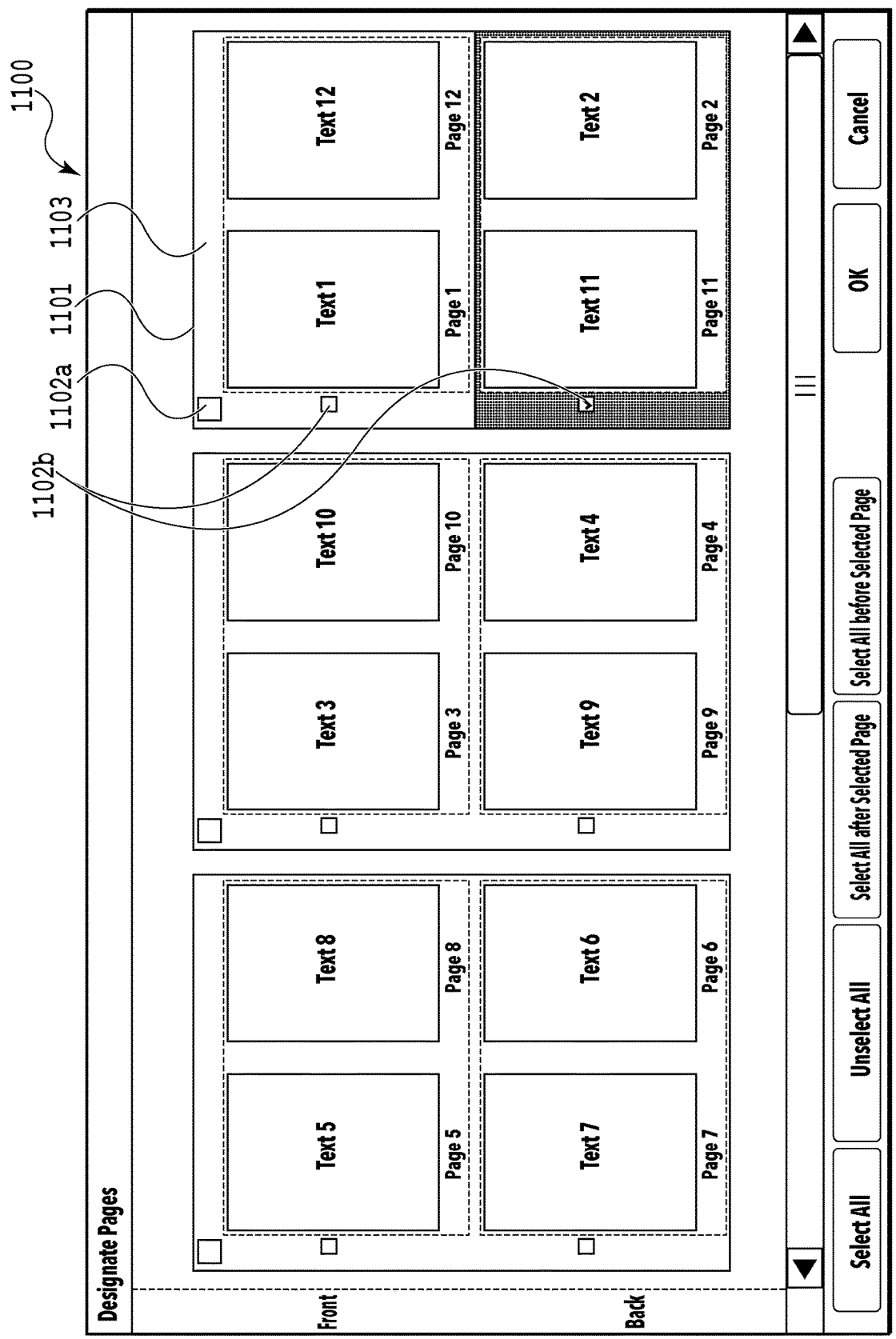
FIG. 11 is a diagram illustrating an example of a setting screen for page-designated printing.

FIG. 11 is a diagram illustrating an example of the second setting screen 1100 for page-designated printing displayed in response to pressing the "Select" button 606. This example is the same as the example of FIG. 7 except for the page allocation setting. Thus, in this example, the user can individually select sheets or pieces of page data to be printed. The second setting screen 1100 includes frames 1101 each representing a sheet as a paper sheet on which previewed pieces of page data are to be printed. The second setting screen 1100 also includes third checkboxes 1102a as third interfaces, fourth checkboxes 1102b as fourth interfaces, and regions 1103.

In this example, on a single sheet, the ((N/2)+2m+2)-th page will be printed on the right side of the front surface of the sheet, and the ((N/2)−2m−1)-th page will be printed on the left side of the front surface of the sheet, where N is the total number of pages, and m is an integer of 0 or more. Moreover, the ((N/2)−2m)-th page will be printed on the right side of the back surface of the same sheet, and the ((N/2)+2m+1)-th page will be printed on the left side of the back surface. This example illustrates a case where the total number of pages N is 12. Thus, the ((12/2)+2m+2)-th page (12th page with m=2) will be printed on the right side of the front surface, and the ((12/2)−2m−1)-th page (1st page with m=2) will be printed on the left side of the front surface. Moreover, the ((12/2)−2m)-th page (2nd page with m=2) will be printed on the right side of the back surface, and the ((12/2)+2m+1)-th page (11th page with m=2) will be printed on the left side of the back surface. With left binding, the ((N/2)−2m−1)-th page will be printed on the right side of the front surface of a single sheet, and the ((N/2)+2m+2)-th page will be printed on the left side of the front surface. Moreover, the ((N/2)+2m+1)-th page will be printed on the right side of the back surface, and the ((N/2)−2m)-th page will be printed on the left side. Thus, in the case where saddle stitch binding is selected, certain calculations are necessary to identify the pages to be printed on each sheet.

Here, in this example, as illustrated in the second setting screen 1100, all pages to be printed on a single sheet are surrounded by a frame 1101. This makes it easier for the user to visually figure out the contents to be printed on each sheet.

Moreover, the user can easily select sheets desired to be printed by checking the corresponding third checkboxes 1102a. Furthermore, the user can easily select pieces of page data desired to be printed by checking the corresponding fourth checkboxes 1102b. The regions 1103 for the selected sheets or pieces of page data become colored. In this way, the user can clearly recognize the sheets or pieces of page data to be printed.

[Case Where Piece of Front-Surface Page Data Fails to be Printed in Manual Double-Sided Printing]

Figure 12:
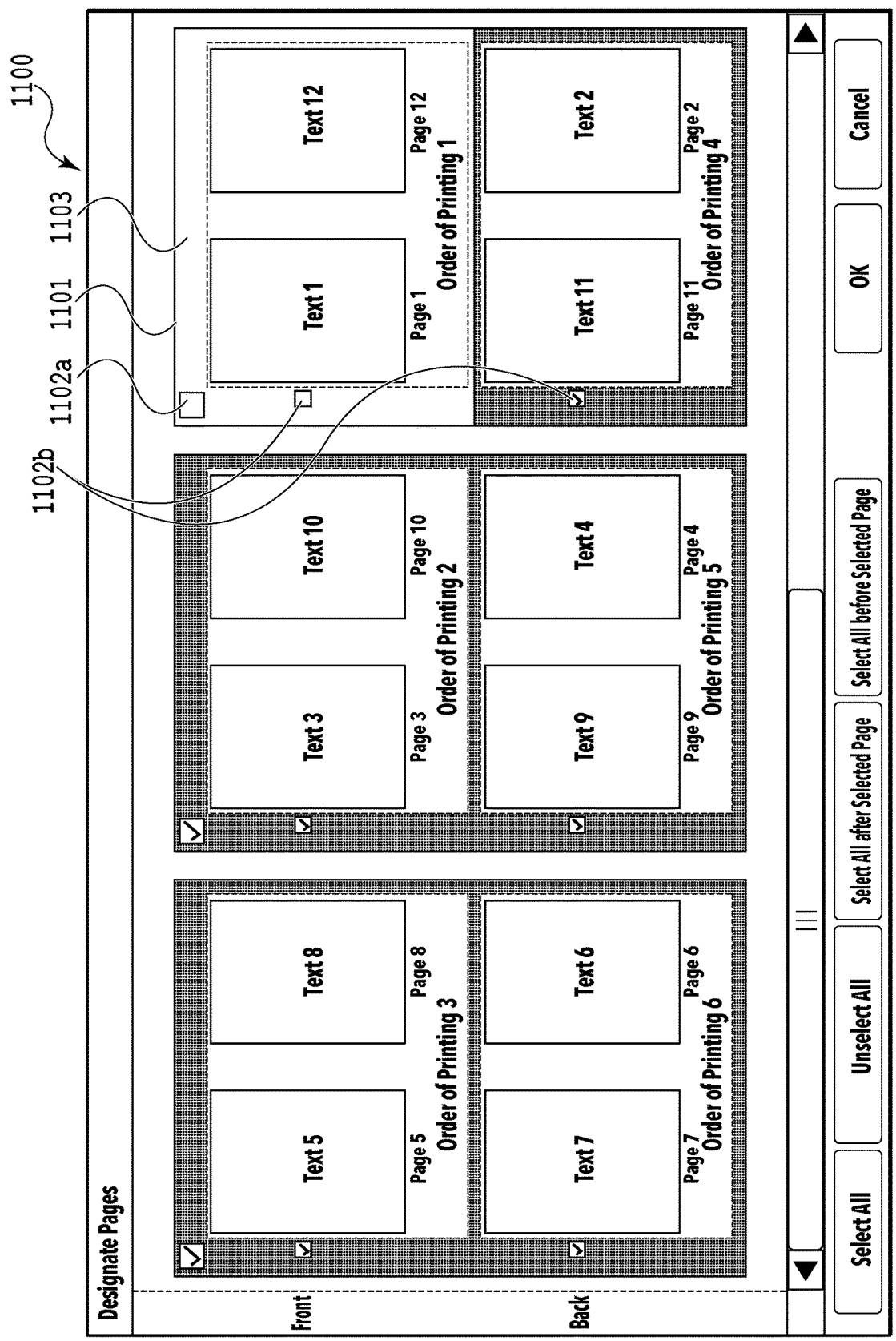
FIG. 12 is a diagram illustrating an example of the setting screen for page-designated printing.

FIG. 12 illustrates an example of the second setting screen 1100 in a case where an error occurs during printing a piece of front-surface page data in this example. This example will be described on the assumption that a paper jam occurs during printing of the piece of front-surface page data (e.g., "Text 3"). As illustrated in FIG. 12, the second setting screen 1100 is displayed with the remaining print targets automatically selected. For example, the third checkbox 1102a for the sheet including "Text 3" and "Text 10" on the front surface and "Text 4" and "Text 9" on the back surface is automatically checked. The fourth checkbox 1102b for "Text 3" and "Text 10" and the fourth checkbox 1102b for "Text 4" and "Text 9" are automatically checked as well. Similarly, the third checkbox 1102a for the sheet including "Text 5", "Text 8", "Text 6", and "Text 7" is automatically checked. The fourth checkbox 1102b for "Text 5" and "Text 8" and the fourth checkbox 1102b for "Text 6" and "Text 7" are automatically checked as well.

In addition, the fourth checkbox 1102b for "Text 11" and "Text 2" is automatically checked. The regions 1103 for the selected sheets and pieces of page data become colored. In this way, the user can clearly recognize the selected sheets and pieces of page data. In this example, the pieces of page data of "Text 1" and "Text 12" were successfully printed. Thus, the pieces of page data of "Text 1" and "Text 12" do not need to be reprinted. The fourth checkbox 1102b for "Text 1" and "Text 12" is therefore not automatically checked. The user can manually check the fourth checkbox 1102b for "Text 1" and "Text 12" if not satisfied with the print result of the pieces of page data of "Text 1" and "Text 12".

[Case Where Back Surface Fails to be Printed in Manual Double-Sided Printing]

A description will now be given of a case where a back surface in document data created by saddle stitch binding fails to be printed in manual double-sided printing.

Figure 13:
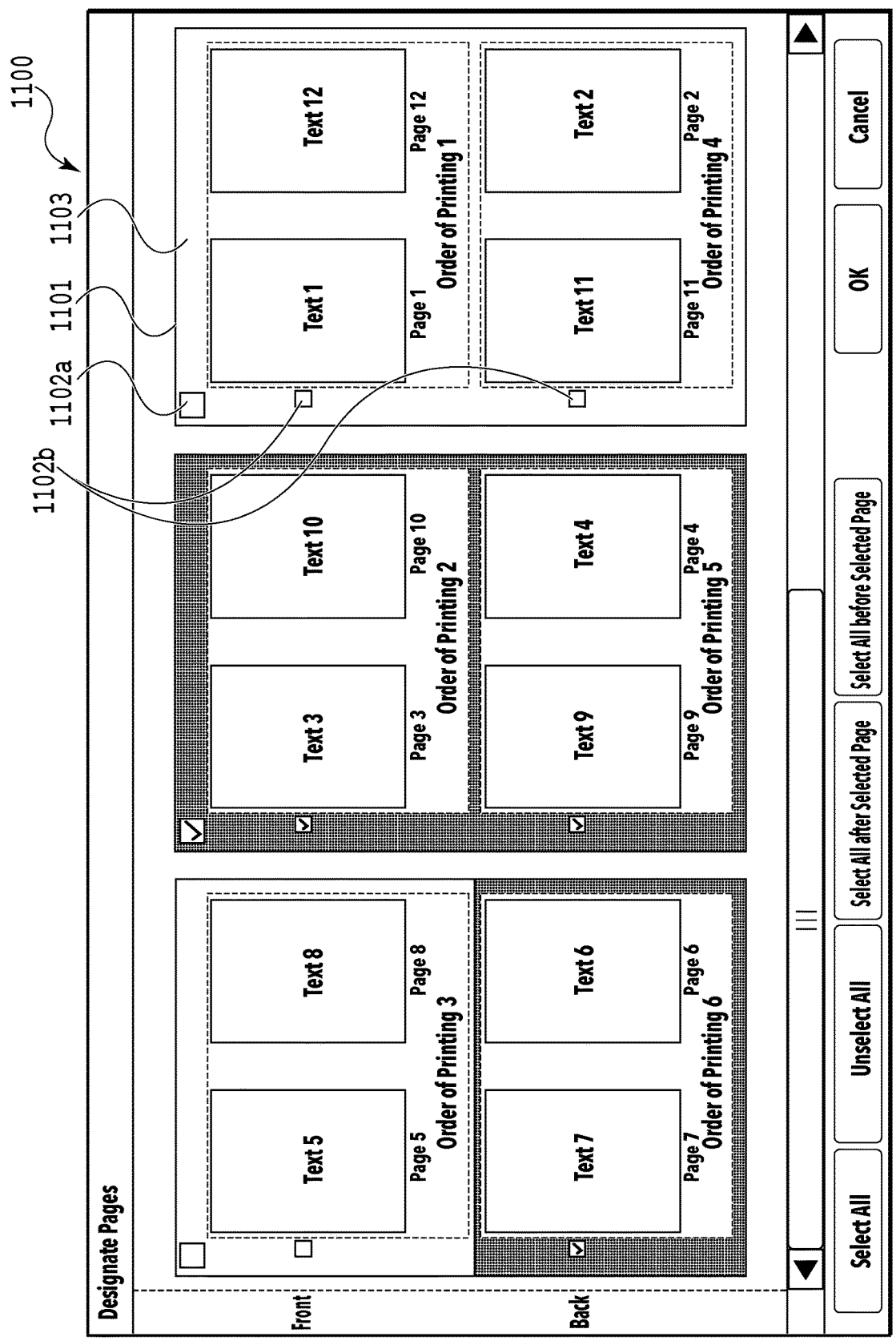
FIG. 13 is a diagram illustrating an example of the setting screen for page-designated printing.

FIG. 13 illustrates an example of the second setting screen 1100 in a case where an error occurs during printing of a piece of back-surface page data in manual double-sided printing with saddle stitch binding and right binding. This example will be described on the assumption that a paper jam occurs during printing of the piece of back-surface page data (e.g., "Text 4"). In this example, since the piece of back-surface page data ("Text 4") is a print target in the manual double-sided printing, the pieces of front-surface page data (i.e., "Text 3" and "Text 10") must essentially have been printed successfully.

However, due to the failure to print the piece of back-surface page data ("Text 4"), the pieces of page data on the opposite surface (i.e., "Text 3" and "Text 10") must be reprinted. In sum, in this example, the entirety of the sheet having the pieces of page data of "Text 3", "Text 10", "Text 4", and "Text 9" must be reprinted. This is because printing of a paper sheet as a whole can be considered a failure in a case where one surface is successfully printed but the opposite surface fails to be printed. For example, even if "Text 3" and "Text 10" have been successfully printed, the paper sheet itself, on which "Text 3" and "Text 10" are printed, may be deformed or broken if a paper jam occurs during the printing of the piece of page data of "Text 4". Here, suppose that the user manually selects targets to be reprinted. In this case, the user may forget to select the pieces of page data of "Text 3" and "Text 10" since the pieces of page data of "Text 3" and "Text 10" have already been printed successfully.

To address this, in this example, the sheet including the piece of page data that failed to be printed is identified. The sheet including the piece of page data that failed to be printed is displayed in a selected state. For example, the sheet including the piece of page data of "Text 4" having failed to be printed (the sheet including the pieces of page data of "Text 4", "Text 9", "Text 3", and "Text 10") is identified.

Then, the second setting screen 1100 is displayed with the fourth checkbox 1102b for the pieces of front-surface page data to be reprinted ("Text 3" and "Text 10") automatically checked. Moreover, the second setting screen 1100 is displayed with the fourth checkbox 1102b for the pieces of page data to be printed after "Text 4" and "Text 9" (e.g., "Text 6" and "Text 7") automatically checked. Furthermore, the second setting screen 1100 is displayed with the third checkbox 1102a for the sheet including the pieces of page data of "Text 4", "Text 9", "Text 3", and "Text 10" automatically checked.

In this way, the user can easily configure the reprint setting even in a case where an error occurs during printing of a piece of back-surface page data by manual double-sided printing. It is to be noted that this example has been described on the assumption that manual double-sided printing is performed with saddle stitch binding (2 in 1), but is also applicable to a case of performing manual double-sided printing with side stitch binding (1 in 1).

Second Embodiment

The present embodiment is aimed at providing a technology for displaying a guide screen 1400 for prompting the user to set paper sheets again. In the following description, components which are the same as or correspond to those in the first embodiment are denoted by the same reference signs and their description is omitted. Differences will be mainly described. As described above, in the first embodiment, after normally printing all pieces of front-surface page data, the printing apparatus 151 notifies the information processing apparatus 101 of that fact. In response to receiving this notification, the CPU 103 of the information processing apparatus 101 according to the present embodiment executes a process of displaying the guide screen 1400 that prompts the user to set the paper sheets again on the display unit 108. Specifically, the guide screen 1400 is a screen displayed on the display unit 108 in a case where all pieces of front-surface page data have been normally printed and the pieces of back-surface page data are the only targets to be reprinted. It is to be noted that "reprinting" to be described in the present embodiment refers to a notion including resuming print processing in manual double-sided printing after suspending the print processing as a result of normally printing the front-surface pages (i.e., starting print processing of the pieces of back-surface page data). In other words, even in a case where no error has occurred, print processing resumed after being suspended will be referred to as reprinting.

As described above, manual double-sided printing requires the user to set the paper sheets again to print pieces of back-surface page data after pieces of front-surface page data are normally printed. If the user forgets to flip the paper sheets and set them again, the pieces of back-surface page data will be printed over the printed front surfaces of the paper sheets. To address this, in the present embodiment, the guide screen 1400 for prompting the user to flip the paper sheets and set them again is displayed on the display unit 108 after all pieces of front-surface page data are normally printed. In sum, the guide screen 1400 is displayed on the display unit 108 in a case where the pieces of back-surface page data are the only targets to be reprinted.

(Guide Screen 1400)

Figure 14:
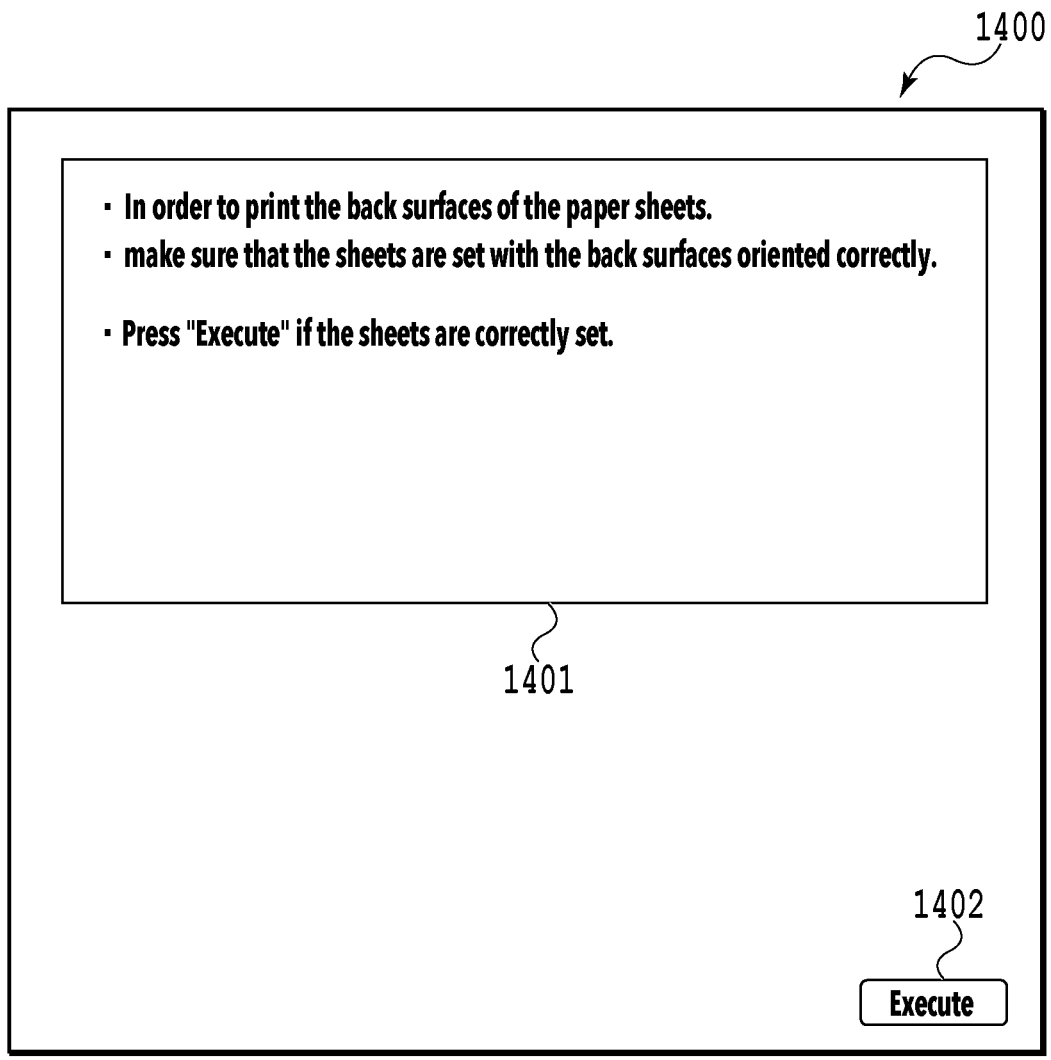
FIG. 14 is a diagram illustrating an example of a guide screen.

FIG. 14 is a diagram illustrating an example of the guide screen 1400 displayed on the display unit 108. The guide screen 1400 includes a message 1401 and an "Execute" button 1402. The message 1401 displayed on the guide screen 1400 includes information prompting the user to recheck the surfaces of the paper sheets to be printed. The "Execute" button 1402 is a button for causing the printing apparatus 151 to execute print processing of the pieces of back-surface page data (i.e., to resume the print processing). In a case where the user presses the "Execute" button 1402, the CPU 103 transmits a print resumption (i.e., reprint) instruction to the printing apparatus 151. Thus, in the case where the pieces of back-surface page data are the only targets to be printed, the user can check the surfaces of the paper sheets to be printed before pressing the "Execute" button 1402. This can prevent the pieces of back-surface page data from being printed on the printed front surfaces of the paper sheets.

Figure 15:
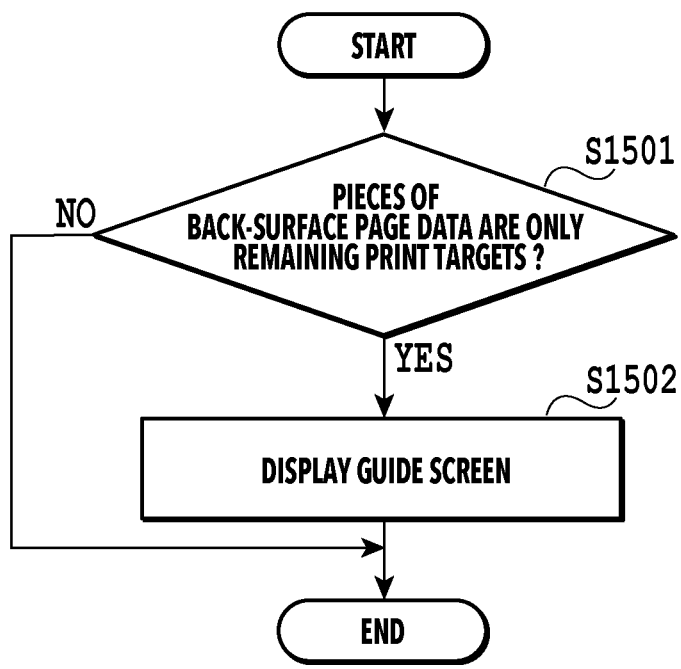
FIG. 15 is a chart illustrating a flow of displaying the guide screen.

FIG. 15 is a flowchart illustrating a procedure of displaying the guide screen 1400 in the present embodiment. In S1501, the CPU 103 determines the subsequent processing based on whether the pieces of back-surface page data are the only remaining print targets based on the information on the remaining print targets identified in S903. If the pieces of back-surface page data are the only remaining print targets, the CPU 103 proceeds to S1502. On the other hand, if the pieces of back-surface page data are not the only remaining print targets, the CPU 103 terminates the flow. In S1502, the CPU 103 executes a process of displaying the guide screen 1400 on the display unit 108. After finishing the process of this step, the CPU 103 terminates the flow. The above is a general procedure of the flow.

The information processing apparatus 101 according to the present embodiment can let the user recognize that the pieces of back-surface page data are the only targets to be reprinted. Thus, even if the user forgets to flip the paper sheets and set them again, the user can flip the paper sheets and set them again before the pieces of back-surface page data are printed on the front surfaces of the paper sheets. In other words, wasteful printing can be prevented. That is, the information processing apparatus 101 according to the present embodiment can further improve user-friendliness of printing.

Third Embodiment

On the first setting screen 700 in the first embodiment, the order of printing is displayed in a case of performing reprinting. In another example of the first setting screen 700, the number of successfully printed pages (hereinafter referred to as "number of printed pages") may be displayed. The present embodiment is aimed at providing a technology that enables the user to recognize the progress of print processing. In the following description, components which are the same as or correspond to those in the first embodiment are denoted by the same reference signs and their description is omitted. Differences will be mainly described.

(Third Setting Screen 1600)

Figure 16:
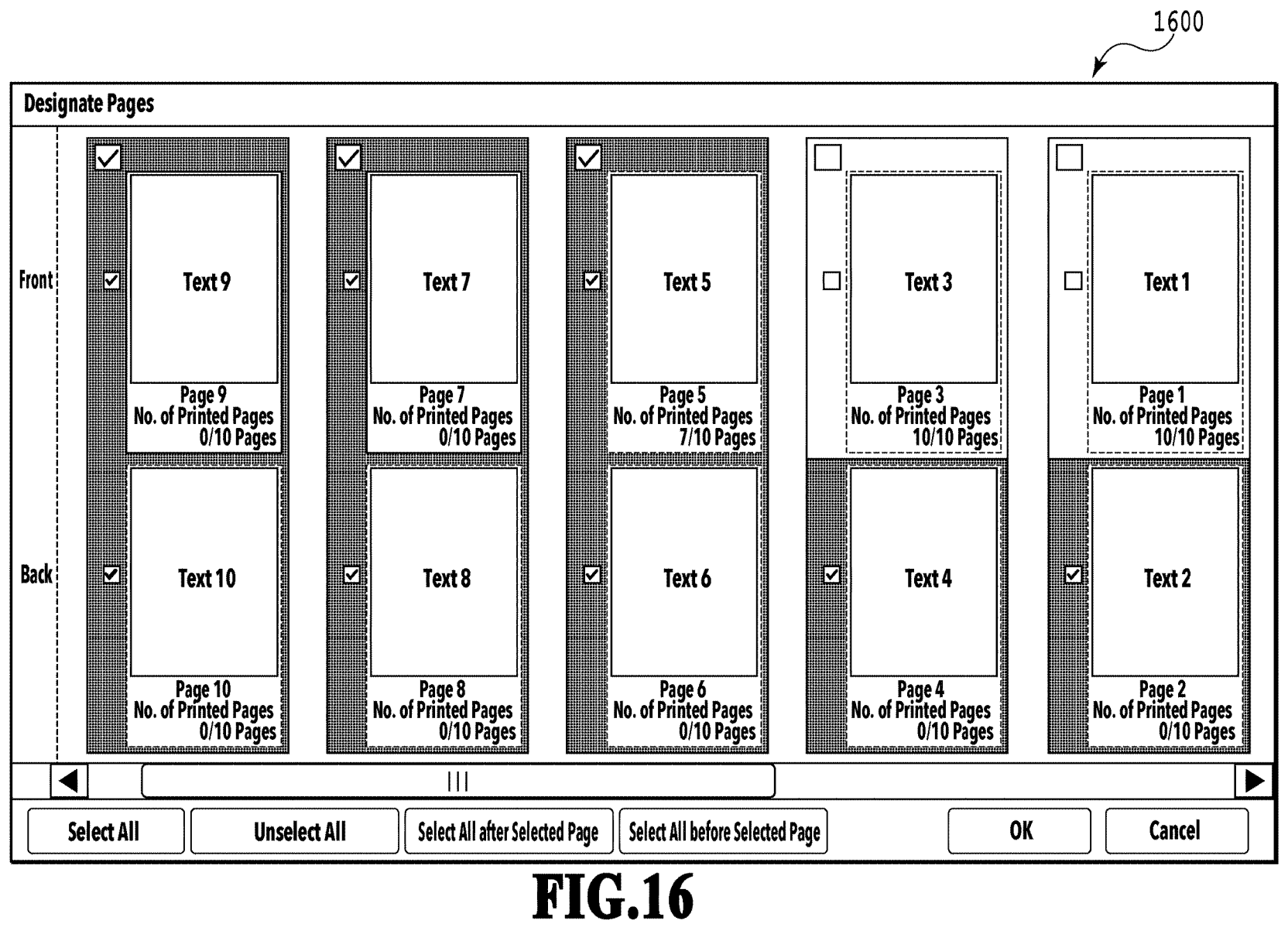

FIG. 16 is a diagram illustrating an example of a third setting screen 1600 for page-designated printing displayed on the display unit 108 in a case where an error occurs during the printing. In the present embodiment, in a case of reprinting pieces of page data that were not printed, the progress of the print processing is displayed. As illustrated in FIG. 16, the third setting screen 1600 includes "Number of Printed Pages". Examples of the method of displaying "Number of Printed Pages" includes a method involving displaying, for each piece of page data, the total number of pages set to be printed, and the number of successfully printed pages out of the total number of pages set to be printed. FIG. 16 represents an example in which an error occurred while the eighth pages was printed for the piece of page data of "Text 5" in printing of 10 pages per piece of page data. As mentioned above, in manual double-sided printing, the print processing of the pieces of back-surface page data starts after the pieces of front-surface page data are printed. Thus, the order of printing is "Text 1", "Text 3", "Text 5", "Text 7", "Text 9", "Text 2", "Text 4", "Text 6", "Text 8", and "Text 10". In the present embodiment, 10 pages were successfully printed for the pieces of page data of "Text 1" and "Text 3", and therefore "Number of Printed Pages" is displayed as "10/10 Pages". In the example of FIG. 16, the error occurred while the eighth page was printed for the piece of page data of "Text 5, and therefore "Number of Printed Pages" of "Text 5" is displayed as "7/10 Pages". Also, since the error occurred during the printing of the piece of page data of "Text 5", no page has been printed for the piece of page data of "Text 7" or any of those after it. Accordingly, "Number of Printed Pages" of "Text 7" and those after it is displayed as "0/10 Pages".

The information processing apparatus 101 according to the present embodiment displays "Number of Printed Pages" on the third setting screen 1600. In this way, the user can recognize up to what page the printing has been done out of the number of pages set to be printed (i.e., progress). That is, the information processing apparatus 101 according to the present embodiment can further improve user-friendliness of printing.

Fourth Embodiment

The present embodiment is aimed at providing a technology which enables the user to recognize the page to be printed at the time of resuming printing even in case where the printing apparatus 151 cannot identify the page that failed to be printed. In the following description, components which are the same as or correspond to those in the first embodiment are denoted by the same reference signs and their description is omitted. Differences will be mainly described.

Errors during printing include such an error that the printing apparatus 151 can automatically suspend the print processing at the time of occurrence of the error (e.g., a paper jam), and such an error that the printing apparatus 151 cannot automatically suspend the print processing at the time of occurrence of the error (e.g., ink wear). For example, in a case where ink wear occurs while printing is executed, the print processing remains continued in the printing apparatus 151. A description will be given below of a technology which enables the user to recognize the target to be printed at the time of resuming printing even in a case where the printing apparatus 151 cannot identify the page that failed to be printed at the time of occurrence of such an error. The following description will be given on the assumption that ink wear occurs while the eighth page is printed for the piece of page data of "Text 5" in printing of 10 pages per piece of page data from "Text 1" to "Text 10" by manual double-sided printing with side stitch binding and right binding.

Figure 17:
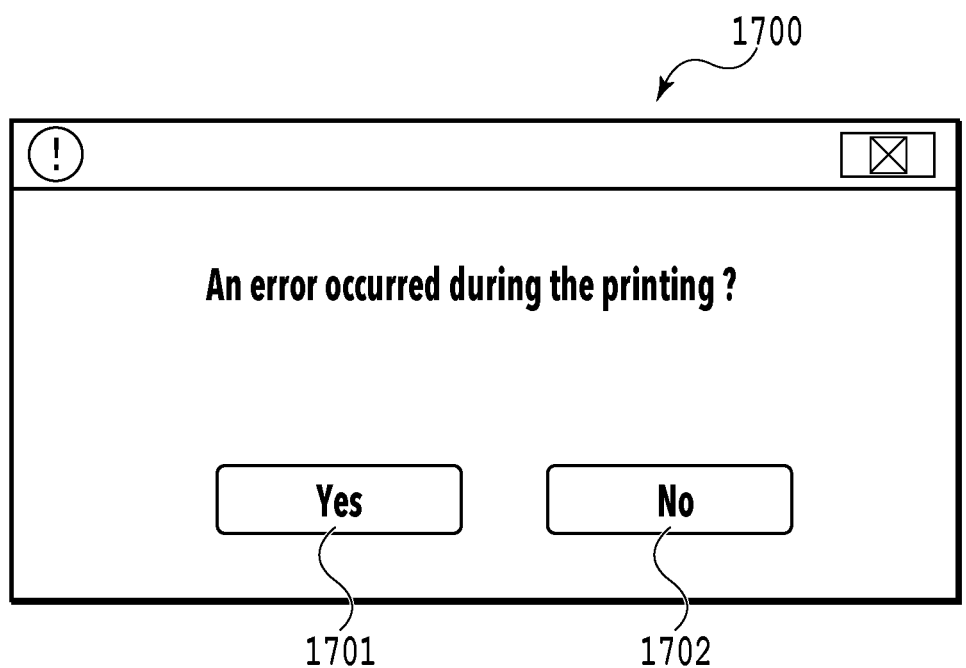
FIG. 17 is a diagram illustrating an example of an error confirmation screen in a bookbinding application.

FIG. 17 illustrates an example of an error confirmation screen 1700 displayed on the display unit 108 after the information processing apparatus 101 transmits a print instruction to the printing apparatus 151. The error confirmation screen 1700 includes a confirmation message for confirming whether an error has occurred, a "Yes" button 1701, and a "No" button 1702. In a case where the user presses the "Yes" button 1701, an instruction to suspend the print processing is transmitted from the information processing apparatus 101 to the printing apparatus 151, and then the screen transitions to a selection screen 1800 (see FIG. 18) for selecting the page whose printing is to be stopped. Specifically, the CPU 103 executes a process of transmitting an instruction to suspend the print processing to the printing apparatus 151, and a process of displaying the selection screen 1800. In response to receiving this suspension instruction, the printing apparatus 151 suspends the currently performed print processing. In sum, in the case where the user presses the "Yes" button 1701, the print processing is suspended regardless of whether an error has actually occurred or not. Then, the selection screen 1800 is displayed. On the other hand, in a case where the user presses the "No" button 1702, the printing apparatus 151 continues the print processing.

Figure 18:
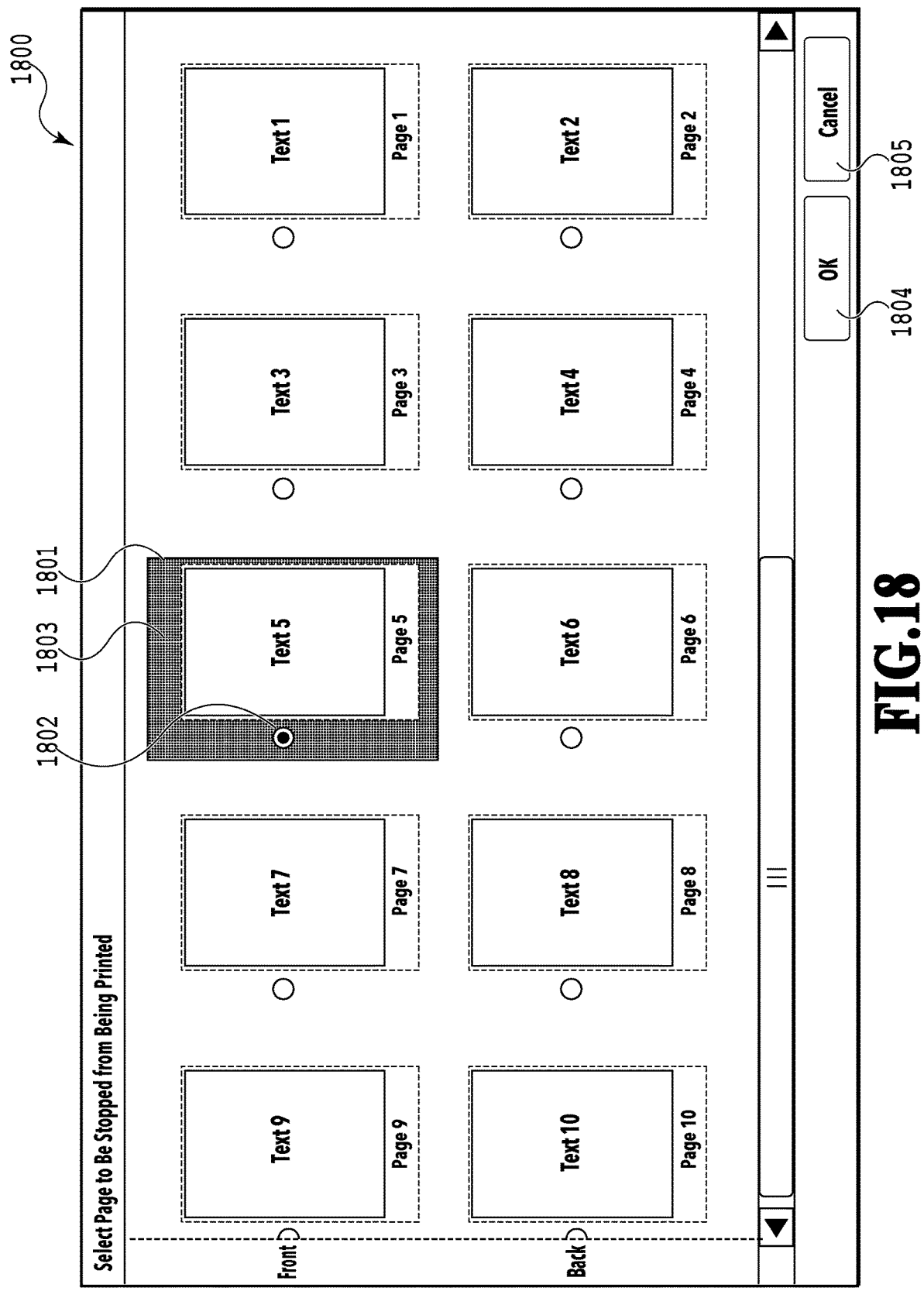
FIG. 18 is a diagram illustrating an example of a selection screen in the bookbinding application.

FIG. 18 illustrates an example of the selection screen 1800 displayed on the display unit 108 after the user presses the "Yes" button 1701. The selection screen 1800 includes frames 1801, radio buttons 1802, regions 1803, an "OK" button 1804, and a "Cancel" button 1805. In the selection screen 1800, a radio button 1802 is provided for each piece of page data. The user can select the piece of page data whose printing was suspended by selecting the corresponding radio button 1802. In other words, in the present embodiment, the piece of page data which was subjected to print processing at the time of suspension of the printing can be identified by having the user select the page that was subjected to the print processing at the time of the suspension of the print processing. In this example, each radio button 1802 is illustrated to the left of the corresponding frame 1801, but may be arranged at such a position that the user can recognize its association with the frame 1801, such as a predetermined outside position to the right of or above or below the frame 1801 or a predetermined position on the line of the frame 1801.

Moreover, the radio button 1802 is a mere example, and another interface with which the piece of page data is easily selectable, such as a checkbox, may be used instead. Furthermore, in response to selecting one of the radio buttons 1802, a predetermined display for making the selection easily recognizable can be performed, such as changing the color of the region 1803 in the frame 1801 corresponding to that radio button 1802. This example represents a case where the user noticed ink wear during printing of the piece of page data of "Text 5" and selected the radio button 1802 for the piece of page data of "Text 5". In a case where the user presses the "OK" button 1804, an error is considered to have occurred on the page selected by the user, and the screen transitions to a print resumption screen 1900 (see FIG. 19) for instructing the printing apparatus 151 to resume the print processing. Specifically, the CPU 103 executes a process of identifying the page on which the error occurred, and a process of displaying the print resumption screen 1900. In sum, in the case where the user presses the "OK" button 1804, an error is considered to have occurred on the selected page regardless of whether an error actually occurred on the selected page or not. Then, the print resumption screen 1900 is displayed. On the other hand, in a case where the user presses the "Cancel" button 1805, the screen returns to the error confirmation screen 1700. By having the user select a page on which an error occurred from the selection screen 1800, it is possible to identify the piece of page data which was subjected to the print processing at the time of suspension of the printing.

Figure 19:
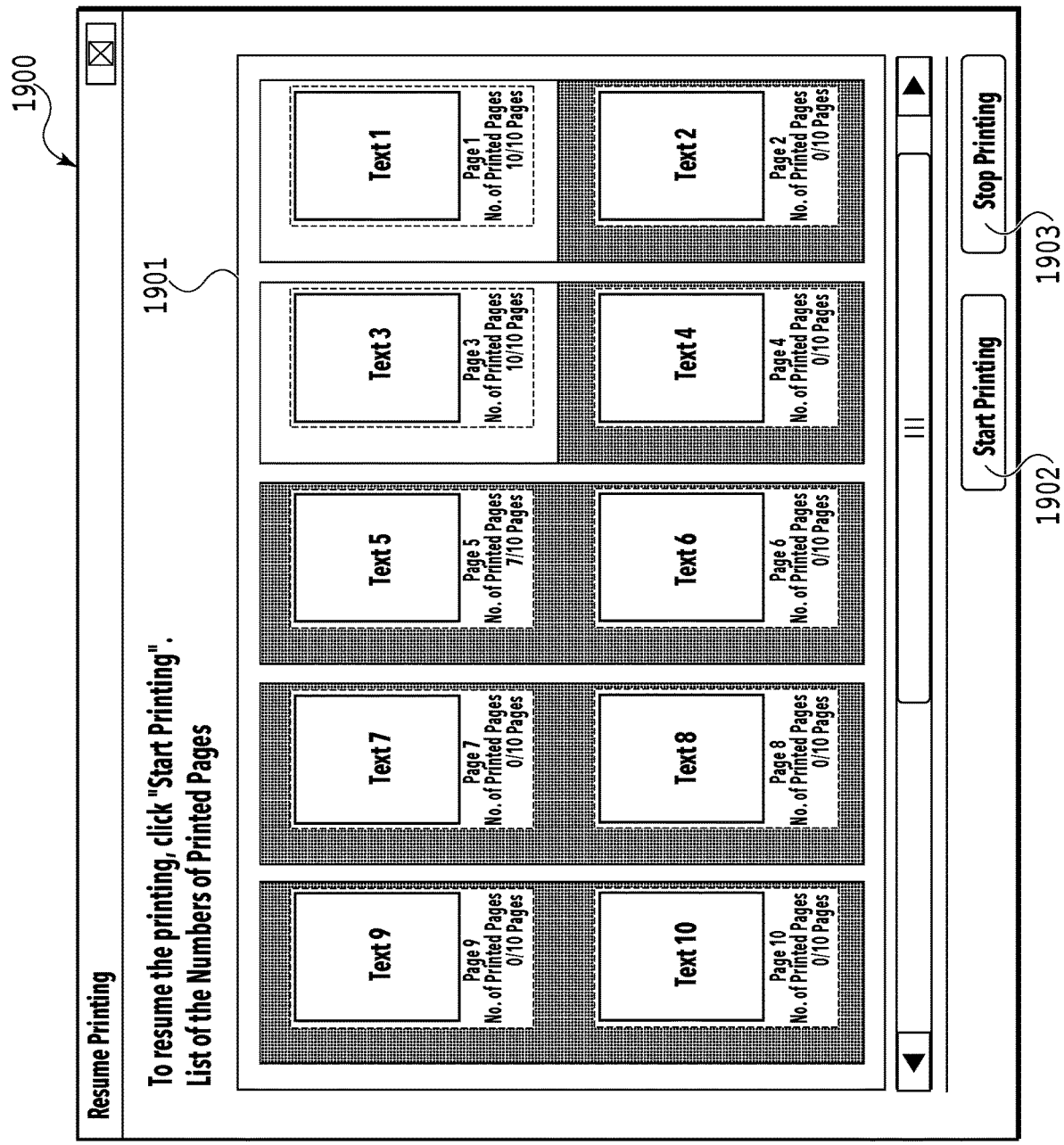
FIG. 19 is a diagram illustrating an example of a print resumption screen in the bookbinding application.

FIG. 19 illustrates an example of the print resumption screen 1900 displayed on the display unit 108 after the user presses the "OK" button 1804. The print resumption screen 1900 includes a region 1901 indicating the number of printed pages for each piece of page data, a "Start Printing" button 1902, and a "Stop Printing" button 1903. In the print resumption screen 1900, at least a preview image of the piece of page data identified by the selection made by the user is displayed. In this example, an error occurred during printing of the eighth page for the piece of page data of "Text 5", and therefore a preview image of the piece of page data of "Text 5" is displayed.

Also, "Number of Printed Pages" of "Text 1" and "Text 3" is displayed as "10/10 Pages". Moreover, "Number of Printed Pages" of "Text 5" is displayed as "7/10 Pages". Furthermore, "Number of Printed Pages" of "Text 6" and those after it is displayed as "0/10 Pages". In addition, the piece of page data to be printed on and after "Text 5" set as the reprint target by the user are displayed in an automatically selected and highlighted state. The example of FIG. 19 illustrates how the pieces of page data of "Text 7", "Text 9", "Text 2", "Text 4", "Text 6", "Text 8", and "Text 10", which are to be printed on and after "Text 5", are displayed in an automatically selected and highlighted state. In a case where the user presses the "Start Printing" button 1902, the CPU 103 transmits an instruction to resume the printing to the printing apparatus 151. On the other hand, in a case where the user presses the "Cancel" button 1805, the screen returns to the selection screen 1800.

With the information processing apparatus 101 according to the present embodiment, even in a case where the printing apparatus 151 cannot identify a page that failed to be printed, the page that failed to be printed can be identified by a selection made by the user. Moreover, the target to be reprinted at the time of resuming the printing is displayed in an automatically selected state. With this configuration, even in a case where there occurs such an error that the printing apparatus 151 will not suspend print processing, the target to be reprinted is displayed in an automatically selected state on the display unit 108. For example, even in a case where ink wear occurs, the target to be reprinted is displayed in an automatically selected state on the display unit 108. Also, even in a case where a print result is different from what the user expected (e.g., the color of the print product is thicker or thinner than the color which the user expected), the target to be reprinted is displayed in an automatically selected state on the display unit 108.

Moreover, even in a case where the printing apparatus 151 does not include or cannot use the error detecting unit 158, the user can select a page that failed to be printed to display the print target in an automatically selected state on the display unit 108.

For example, even in a case of performing print processing with an inexpensive printing apparatus 151 not including the error detecting unit 158, the reprint target is displayed in an automatically selected state on the display unit 108.

Furthermore, with the information processing apparatus 101 according to the present embodiment, a reprint target is displayed in an automatically selected state on the display unit 108 even in a case where the communication settings of the information processing apparatus 101 and the printing apparatus 151 only allow one-way communication from the information processing apparatus 101 to the printing apparatus 151. Note that the printing apparatus 151 in this case cannot transmit the progress of the print processing to the information processing apparatus 101. For this reason, for example, the order of printing of the pieces of page data is displayed in place of "Number of Printed Pages".

The user can therefore recognize the print targets to be reprinted only by selecting the page that failed to be printed. That is, the information processing apparatus 101 according to the present embodiment can further improve user-friendliness of printing.

[Modifications of Editing Screens 400 and 500]

Modifications of the editing screens 400 and 500 described in the first embodiment will be described below.

[Case of Creating Covers and Body with Same Type of Paper Sheet by Saddle Stitch Binding]

Figure 20:
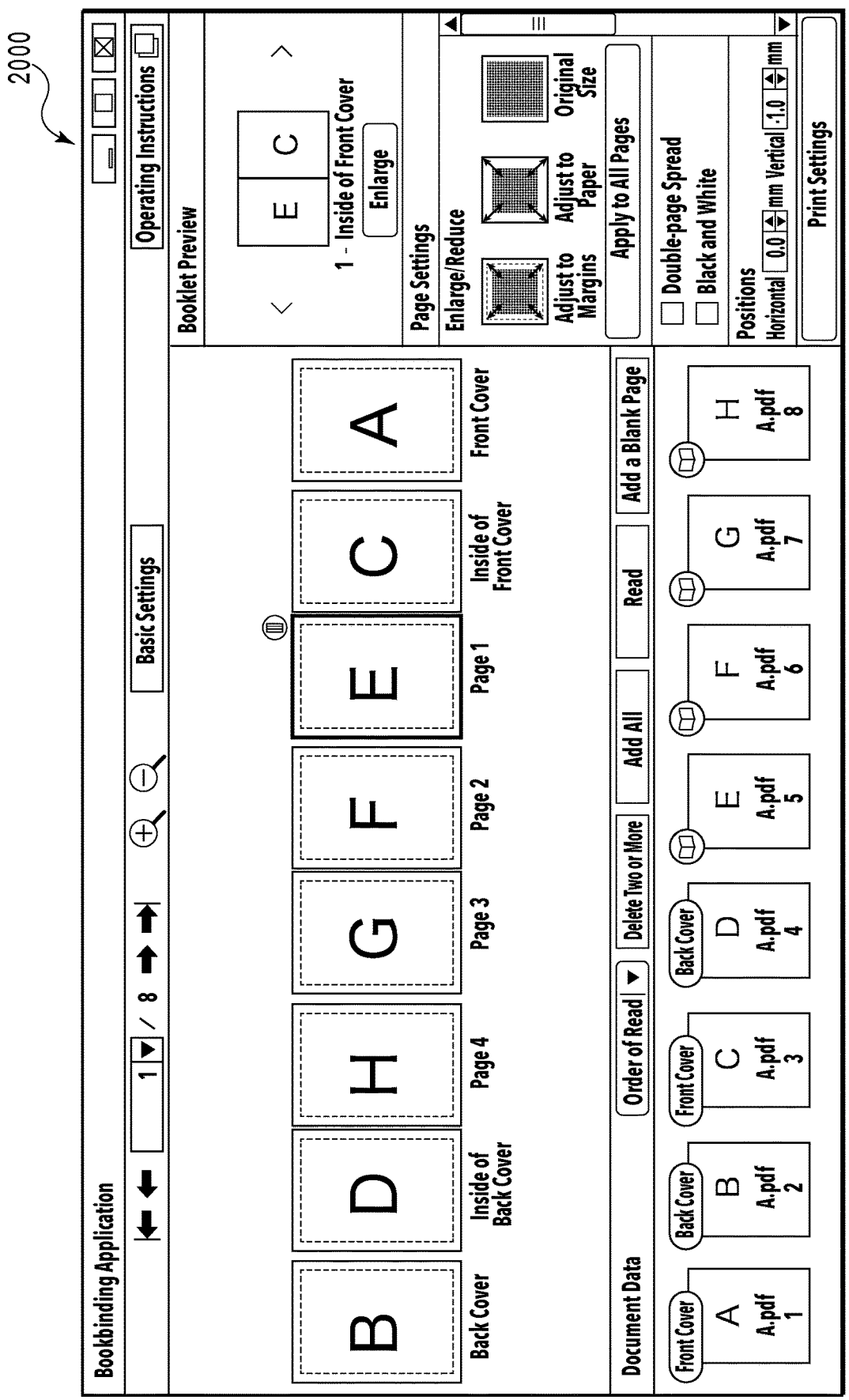
FIG. 20 is a diagram illustrating an example of an editing screen in the bookbinding application.

FIG. 20 represents an example of an editing screen 2000 with settings configured such that the binding method is saddle stitch binding (2 in 1), and the same type of paper sheet is used for the covers and the body. The editing screen 2000 is substantially the same as the editing screen 400. However, for saddle stitch binding, the binding positions are between pages. Thus, marks indicating the binding positions are not displayed, as illustrated in the editing screen 2000 in FIG. 20. In a case where printing is performed on paper surfaces, binding position marks may be indicated at predetermined positions between pages. In a case where the binding method is saddle stitch binding (2 in 1), double-sided printing is performed by 2 in 1. Accordingly, the number of pages for each single paper sheet's surfaces is four pages. Thus, in a case where the number of pages added in the editing region 401 is not a multiple of 4, a blank page(s) or the like can be added to the last section, for example, so that the total number of pages will be a multiple of 4. With saddle stitch binding (2 in 1) and right binding, the $((N/2)+2m+2)$-th page will be printed on the right side of the front surface of a single paper sheet, and the $((N/2)-2m-1)$-th page will be printed on the left side, where N is the total number of pages, and m is an integer of 0 or more. Moreover, the $((N/2)-2m)$-th page will be printed on the right side of the back surface, and the $((N/2)+2m+1)$-th page will be printed on the left side. For example, with N=8, double-sided printing will be performed on a paper sheet such that the sixth and third pages will be on the right and left sides of a front surface, respectively, and the fourth and fifth pages will be on the right and left sides (the back sides of the third and sixth pages) of a back surface, respectively. Similarly, double-sided printing will be performed on a paper sheet such that the eighth and first pages will be on the right and left sides of a front surface, respectively, and the second and seventh pages will be on the right and left sides (the back sides of the first and eighth pages) of a back surface, respectively. Moreover, double-sided printing is performed on a paper sheet such that the back and front covers will be arranged on the right and left sides of the front surface, respectively, and the back sides of the front and back covers will be arranged on the right and left sides of the back surface, respectively. The same applies to left binding except that the right side and the left side mentioned above are inverted.

[Case of Creating Covers and Body with Different Types of Paper Sheets by Side Stitch Binding]

Figure 21:
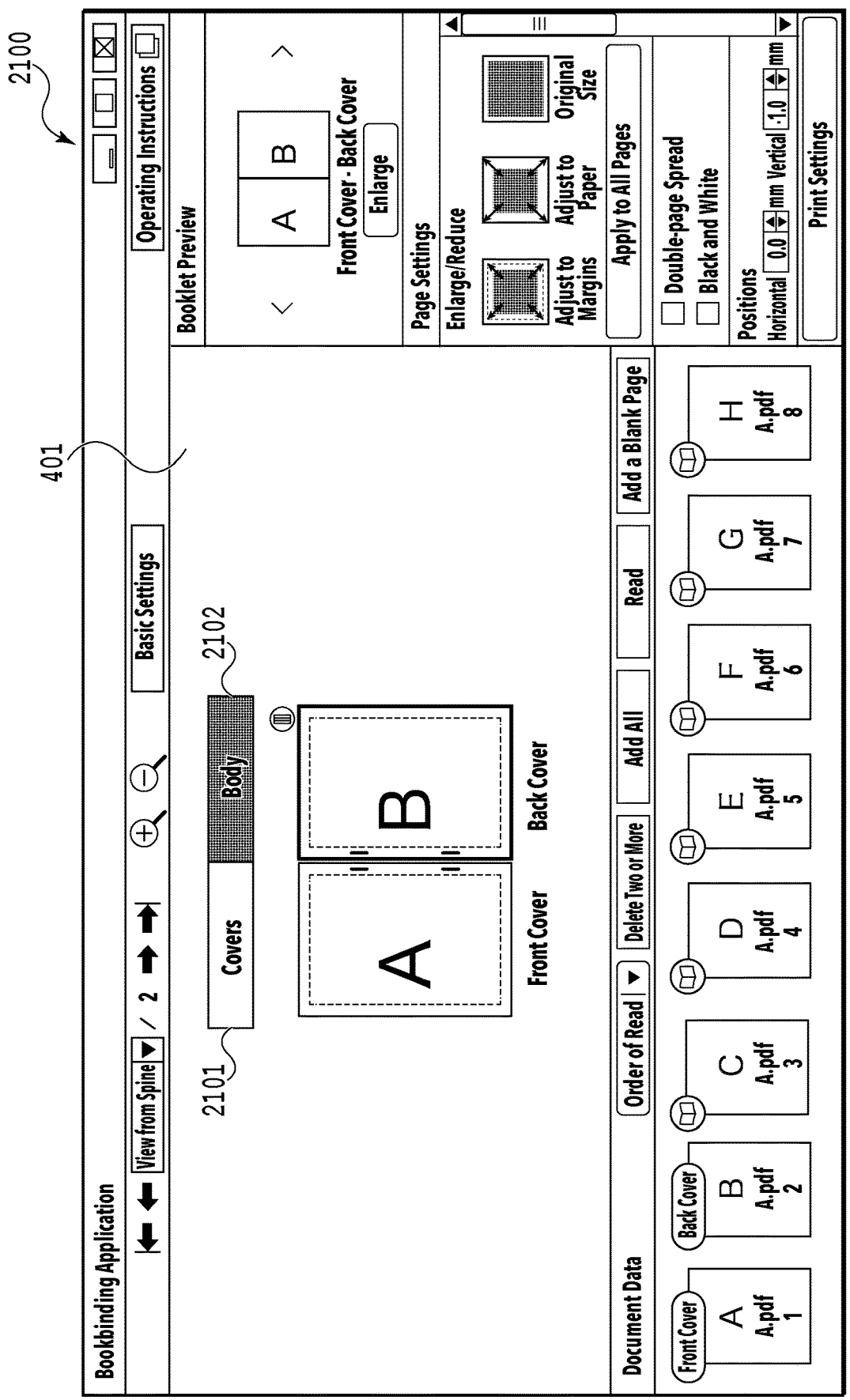
FIG. 21 is a diagram illustrating an example of an editing screen in the bookbinding application.

FIG. 21 is a diagram illustrating an example of a cover editing screen 2100. The editing screen 2100 includes a cover select button 2101 and a body select button 2102. In a case where the body select button 2102 is pressed, the screen transitions to an editing screen 2200.

Figure 22:
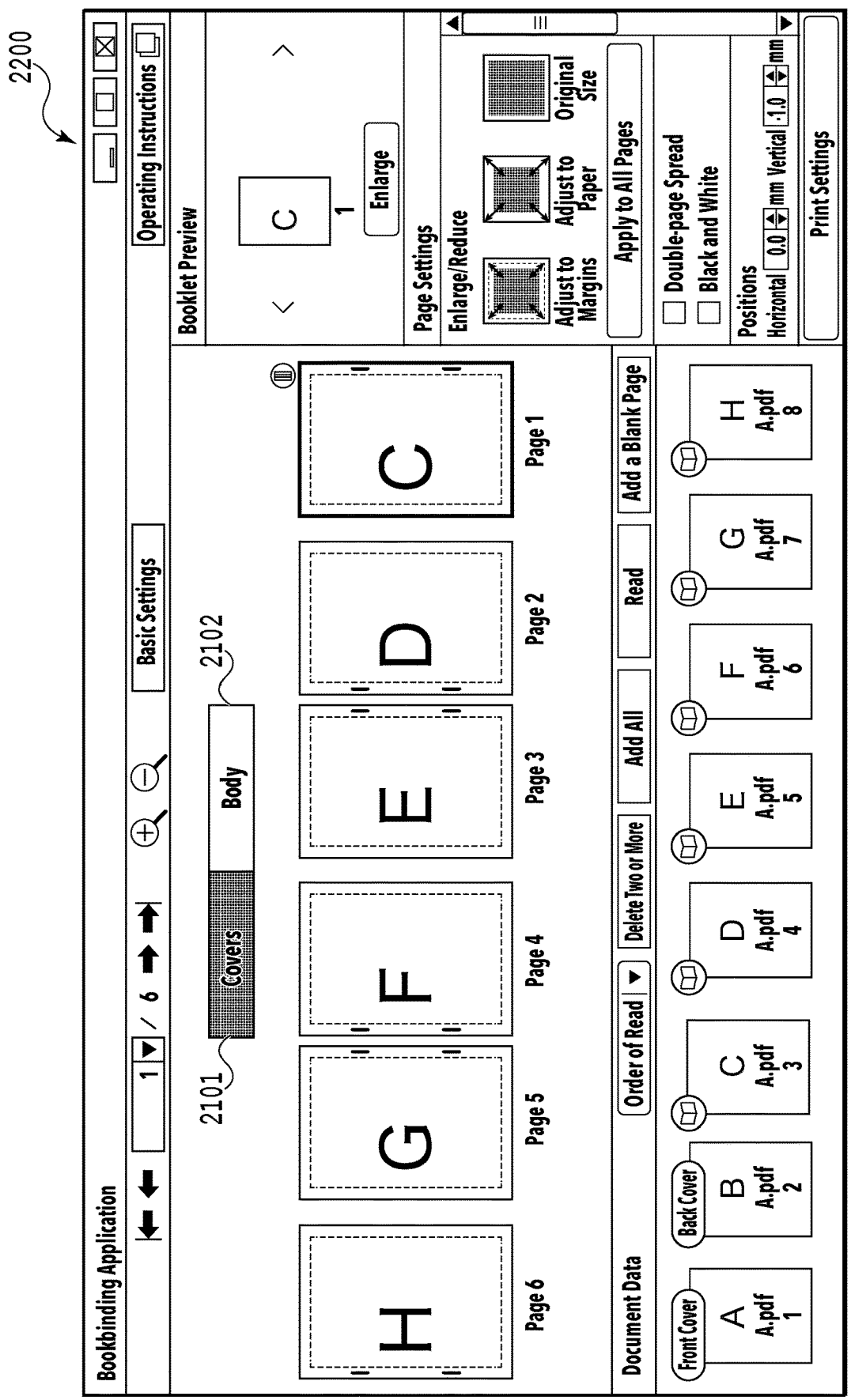
FIG. 22 is a diagram illustrating an example of an editing screen in the bookbinding application.

FIG. 22 is a diagram illustrating an example of the body editing screen 2200. In a case of using different types of paper sheets for the covers and the body, the cover editing screen 2100 as illustrated in FIG. 21 and the body editing screen 2200 as illustrated in FIG. 22 are used. The configuration does not necessarily have to be like the above, but is at least such that the covers and the body can be separately printed. In the case where the cover editing screen 2100 and the body editing screen 2200 are separate, buttons for switching from one to the other are displayed in the editing region 401 in a similar fashion to the cover select button 2101 and the body select button 2102 in FIG. 21, for example. The cover editing screen 2100 as illustrated in FIG. 21 is displayed in a case where the user selects the cover select button 2101. The body editing screen 2200 as illustrated in FIG. 22 is displayed in a case where the user selects the body select button 2102. These buttons may be displayed outside the editing region 401. Alternatively, instead of the button form, a tab form, for example, may be employed such that a tab for the cover editing screen and a tab for the body editing screen are displayed, and the screen may be switched in response to selecting either tab.

On the cover editing screen 2100, only the front and back covers are displayed, as illustrated in FIG. 21. Note that the front and back covers are displayed as viewed from the spine of the booklet. Specifically, with right binding, the front cover is displayed on the left side, and the back cover is displayed on the right side. On the other hand, with left binding, the front cover is displayed on the right side, and the back cover is displayed on the left side. In the case of using side stitch binding, the binding positions are displayed. On the cover editing screen 2100 as above, these binding positions are displayed around the center of the front and back covers arranged side by side, as illustrated in FIG. 21. Thus, on the cover editing screen 2100, the positional relation between the front and back covers is the reverse of that on the editing screen 400 as illustrated in FIG. 4, on which the covers and the body are edited together. Such a display makes it easier for the user to recognize how the booklet after the bookbinding will appear as viewed from the spine side. In the present embodiment, in the case of using different types of paper sheets for the covers and the body, the back side of the front cover and the back side of the back cover are not used (i.e., left blank), but the present embodiment is not limited to such a layout. On the cover editing screen 2100, the back side of the front cover will be displayed next to the front cover, and the back side of the back cover will be displayed next to the back cover, for example, in a case of using the back side of the front cover and the back side of the back cover. In the example of FIG. 21, the back side of the front cover will be displayed to the left of the front cover, and the back side of the back cover will be displayed to the right of the back cover. On the body editing screen 2200, the body, excluding the front and back covers (and their back sides), is displayed in the editing region 401, as illustrated in FIG. 22. The editing screen 2200 in FIG. 22 is the same as FIG. 4 except that the front and back covers and their back sides are not included.

[Case of Creating Covers and Body with Different Types of Paper Sheets by Saddle Stitch Binding]

Figure 23:
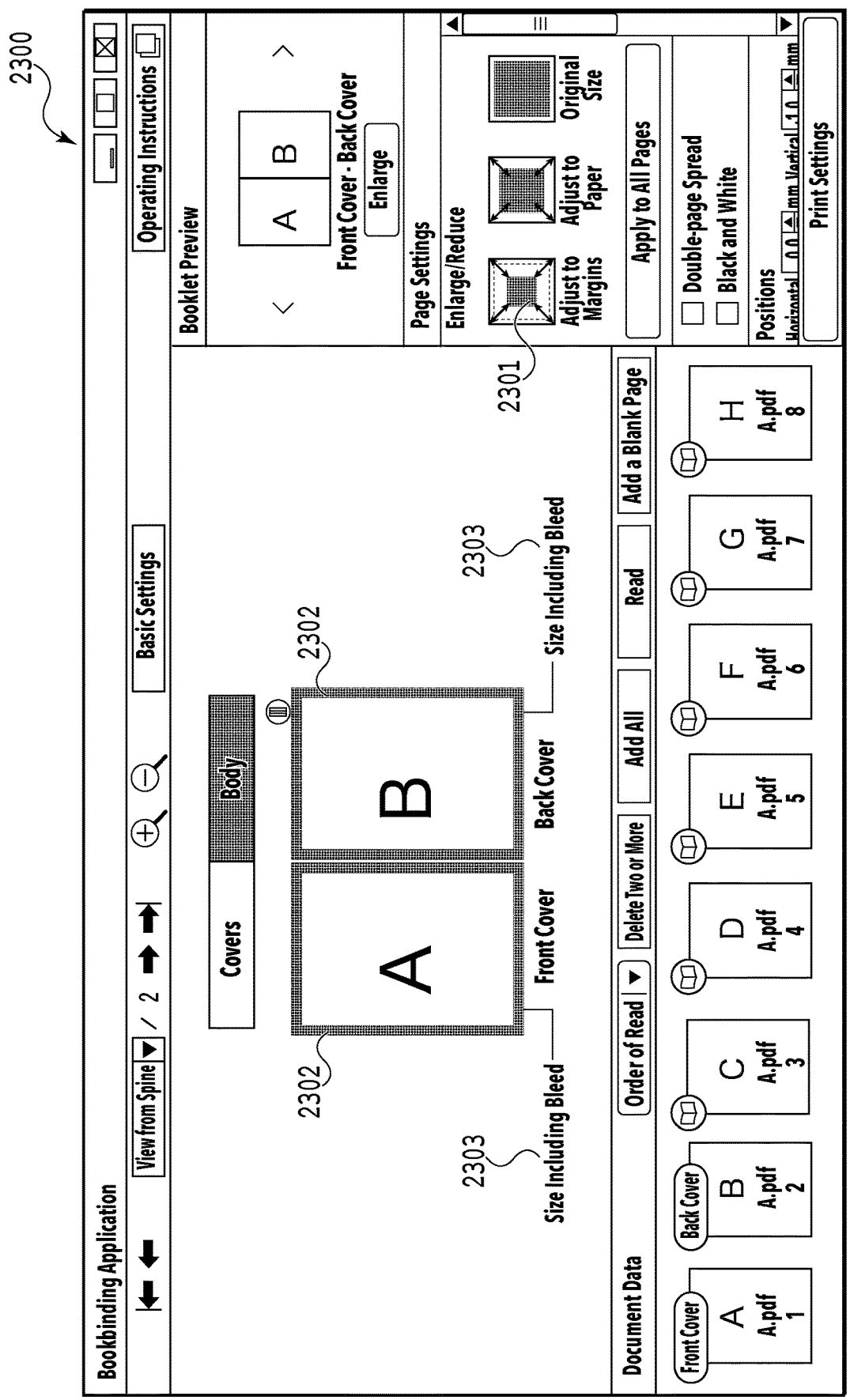
FIG. 23 is a diagram illustrating an example of an editing screen in the bookbinding application.

FIG. 23 is a diagram illustrating an example of an editing screen 2300 in the case of creating the covers and the body with different types of paper sheets using saddle stitch binding as the binding method. The editing screen 2300 includes an option 2301, regions 2302, and descriptions 2303. With settings configured such that saddle stitch binding is selected and different types of paper sheets are used for the covers and the body, the editing screen 2300 is the same as FIGS. 21 and 22 except that no binding position marks are displayed. With saddle stitch binding, the number of pages needs to be a multiple of 4, as mentioned above and, in the case of using different types of paper sheets for the covers and the body, the number of pages in the body needs to be a multiple of 4. Specifically, in the foregoing example, an adjustment is made such that the total number of pages in the covers and the body will be a multiple of 4. On the other hand, in the following example, an adjustment is made such that the number of pages only in the body will be a multiple of 4. Thus, in this example, in a case where the paper sheet of the covers is subjected to one-sided printing, the total number of pages in the covers and the body is not a multiple of 4 (the total number of pages is 4a+2 (a is an integer)). For example, suppose that editing is performed such that the body includes six pages of data. In this case, two blank pages or the like will be inserted so that the number of pages in the body can be a multiple of 4.

In the case of configuring settings so as to use different types of paper sheets for the covers and the body, marginless printing can be performed on the covers by using glossy paper, for example. FIG. 23 illustrates an example of the editing screen 2300 in this case. Marginless printing requires so-called "bleeding" so that the image to be printed will be larger than the original size. Hence, in a case where a paper sheet supporting marginless printing, such as glossy paper, is selected, the regions 2302 each including a bleed, and the descriptions 2303 describing them. The option 2301 is also displayed for adjusting the document data to the size including the bleed via enlargement or shrinkage. In this way, the user can create the covers by marginless printing only by performing simple operations. The above is a description of modifications of the editing screens 400 and 500 described in the first embodiment.

[Case of Creating Booklet by Left Binding]

The order of display of sheets and pieces of page data may be different between a case where right binding is selected on the basic setting screen 300 in FIG. 3 and a case where left binding is selected. In the first embodiment, the first setting screen 700 has been exemplarily described, in which pages shift from right to left in the case where the right binding is selected. In the case where left binding is selected, on the other hand, the page can shift from left to right. In this way, it is possible to provide an interface that appears intuitive to the user.

[Case of Creating Booklet by Automatic Double-Sided Printing]

In a case of performing automatic double-sided printing, front and back surfaces in document data are alternately printed on each sheet. For this reason, reprint targets selected on a per-sheet basis. Thus, in a case where an error occurs during automatic double-sided printing, the sheet including the piece of page data that failed to be printed and the subsequent sheets are displayed in a selected state.

Other Embodiments

In the above embodiments, cases where an instruction is given to execute bookbinding printing have been described. However, the processes in the above embodiment may also be executed in a case of performing printing other than bookbinding printing (e.g., double-sided printing, one-sided printing, or the like).

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

The information processing apparatus according to the present disclosure can improve user-friendliness of printing.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. A control method of an information processing apparatus, the control method comprising the steps of:
identifying remaining page data, among a plurality of page data to be printed, being not printed due to suspension of print processing; and
displaying a preview image of the identified remaining page data as a print target without a user selecting the remaining page data.

2. The control method according to claim 1, wherein the preview image of the remaining page data is displayed in a highlighted state as compared to a preview image of printed page data among the plurality of page data.

3. The control method according to claim 1, wherein progress of the print processing with a preview image of the remaining page data is displayed.

4. The control method according to claim 1, wherein page data, among the plurality of page data, being printed at a time of the suspension of the print processing is determined, and
wherein the remaining page data based on the determined page data being printed at a time of the suspension of the print processing is identified.

5. The control method according to claim 1, wherein a guide for prompting a user to set paper sheets again is displayed after all pages of front-surface page data are normally printed.

6. The control method according to claim 1, wherein a display item for accepting an instruction to print the remaining page data is displayed.

7. The control method according to claim 1, wherein a preview image of the determined page data being printed at a time of the suspension of the print processing as the print target is displayed.

8. The control method according to claim 7, wherein a preview image of specific printed page data as the print target is displayed, and wherein the specific page data is to be printed on a same paper that the determined page data is to be printed on.

9. The control method according to claim 1, wherein the plurality of page data is a print target printed by manual double-sided printing.

10. The control method according to claim 1, wherein the preview image of printed page data among the plurality of page data is not displayed as the print target.

11. The control method according to claim 1, wherein the preview image of the remaining page data is displayed in a selected state without the user selecting the remaining page data.

12. An information processing apparatus comprising:
at least one memory and at least one processor and/or at least one circuit which function as:
an identifying unit configured to identify remaining page data, among a plurality of page data to be printed, being not printed due to suspension of print processing; and
a displaying control unit configured to perform control to display a preview image of the remaining page data identified by the identifying unit as a print target without a user selecting the remaining page data.

13. The information processing apparatus according to claim 12, wherein the display control unit further performs control to display the preview image of the remaining page data in a highlighted state as compared to a preview image of printed page data among the plurality of page data.

14. The information processing apparatus according to claim 12, wherein the display control unit further performs control to display progress of the print processing with a preview image of the remaining page data.

15. The information processing apparatus according to claim 12, wherein the at least one memory and the at least one processor and/or the at least one circuit further function as:
a determining unit configured to determine page data, among the plurality of page data, being printed at a time of the suspension of the print processing,
wherein the identifying unit identifies the remaining page data based on the page data, determined by the determining unit, being printed at a time of the suspension of the print processing.

16. The information processing apparatus according to claim 15, wherein the display control unit further performs control to display a preview image of the page data, determined by the determining unit, being printed at a time of the suspension of the print processing as the print target.

17. The information processing apparatus according to claim 16, wherein the display control unit further performs control to display a preview image of specific printed page data as the print target, and wherein the specific page data is to be printed on a same paper that the page data determined by the determining unit is to be printed on.

18. The information processing apparatus according to claim 12, wherein the display control unit further performs control to display a guide for prompting a user to set paper sheets again after all pages of front-surface page data are normally printed.

19. The information processing apparatus according to claim 12, wherein the display control unit performs control to display a display item for accepting an instruction to print the remaining page data.

20. The information processing apparatus according to claim 12, wherein the plurality of page data is print target printed by manual double-sided printing.

21. The information processing apparatus according to claim 12, wherein the display control unit performs control so that the preview image of printed page data among the plurality of page data is not displayed as the print target.

22. The information processing apparatus according to claim 12, wherein the display control unit performs control so that the preview image of the remaining page data is displayed in a selected state without the user selecting the remaining page data.

23. A non-transitory computer-readable storage medium storing one or more programs for causing a computer to function as:
  an identifying unit configured to identify remaining page data, among a plurality of page data to be printed, being not printed due to suspension of print processing; and
  a display control unit configured to perform control to display a preview image of the remaining page data identified by the identifying unit as a print target without a user selecting the remaining page data.

* * * * *